United States Patent
Sharma et al.

(10) Patent No.: US 12,548,484 B2
(45) Date of Patent: Feb. 10, 2026

(54) ENABLING VEHICLE DISPLAY INTERACTION AND PERSONALIZATION

(71) Applicant: GM Global Technology Operations LLC, Detroit, MI (US)

(72) Inventors: Manoj Kumar Sharma, Troy, MI (US); Donald K. Grimm, Utica, MI (US); Joseph F. Szczerba, Grand Blanc, MI (US); Tzvi Philipp, Bet Shemesh (IL); Thomas A. Seder, Fraser, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 177 days.

(21) Appl. No.: 18/637,976

(22) Filed: Apr. 17, 2024

(65) Prior Publication Data
US 2025/0329279 A1    Oct. 23, 2025

(51) Int. Cl.
*G09G 3/00*    (2006.01)
*B60Q 9/00*    (2006.01)
(Continued)

(52) U.S. Cl.
CPC .............. *G09G 3/03* (2020.08); *B60Q 9/00* (2013.01); *B60R 11/0229* (2013.01);
(Continued)

(58) Field of Classification Search
CPC ....... B60Q 9/00; B60R 11/0229; G06F 3/012; G06F 3/016; G06F 3/017; G06F 3/16;
(Continued)

(56) References Cited

U.S. PATENT DOCUMENTS 10,081,390 B1 * 9/2018 Anderson .............. G08G 1/143
10,134,261 B1 * 11/2018 Nolan .................... G08B 21/24
(Continued)

FOREIGN PATENT DOCUMENTS

CN    107599971 A    1/2018
CN    113119877 A    7/2021
(Continued)

OTHER PUBLICATIONS

United States Patent and Trademark Office. U.S. Appl. No. 18/153,767, filed Jan. 12, 2023.
(Continued)

*Primary Examiner* — Peter D Le
(74) *Attorney, Agent, or Firm* — Vivacqua Crane, PLLC

(57) ABSTRACT

A system for enabling vehicle display and interaction includes a vehicle display server in communication with a plurality of sensors and adapted to track head and eye position and movement of users within the vehicle, detect locations of users within the vehicle and when users change seating positions, detect when a user enters and exits the vehicle, detect and interpret facial and gesture inputs from users, capture images of users, and receive audio inputs from users within the vehicle, haptic feedback devices adapted to provide haptic feedback to users, and a user display system for viewing and interaction by users, the vehicle display server adapted to identify an identity of a user seated within the vehicle, select user specific content to be displayed for the user on the user display system, and automatically display the user specific content on the user display system for viewing by the user.

20 Claims, 7 Drawing Sheets

(51) Int. Cl.
*B60R 11/02* (2006.01)
*G06F 3/01* (2006.01)
*G06F 3/16* (2006.01)
*G06T 7/20* (2017.01)
*G06T 7/70* (2017.01)
*G06V 20/59* (2022.01)
*G06V 40/16* (2022.01)

(52) U.S. Cl.
CPC .............. *G06F 3/012* (2013.01); *G06F 3/016* (2013.01); *G06F 3/017* (2013.01); *G06F 3/16* (2013.01); *G06T 7/20* (2013.01); *G06T 7/70* (2017.01); *G06V 20/597* (2022.01); *G06V 40/176* (2022.01); *G06T 2207/30201* (2013.01); *G06T 2207/30268* (2013.01); *G09G 2340/0464* (2013.01); *G09G 2354/00* (2013.01); *G09G 2370/20* (2013.01); *G09G 2380/10* (2013.01)

(58) Field of Classification Search
CPC ............... G06V 20/597; G06V 40/176; G06T 2207/30201; G06T 2207/30268; G06T 7/20; G06T 7/70; G09G 2340/0464; G09G 2354/00; G09G 2370/20; G09G 2380/10; G09G 3/03
See application file for complete search history.

(56) References Cited

U.S. PATENT DOCUMENTS

| | | | | |
|---|---|---|---|---|
| 10,278,039 | B1* | 4/2019 | Matus | H04W 4/029 |
| 10,318,043 | B2 | 6/2019 | Seder et al. | |
| 10,625,745 | B1* | 4/2020 | Tremblay | B60W 40/09 |
| 10,981,507 | B1* | 4/2021 | Benjamin | B60Q 9/008 |
| 11,639,134 | B1* | 5/2023 | Huizen | B60R 1/088 |
| | | | | 348/77 |
| 11,726,340 | B1* | 8/2023 | Suddreth | B60K 35/50 |
| | | | | 345/8 |
| 2004/0090334 | A1* | 5/2004 | Zhang | G08B 21/06 |
| | | | | 340/575 |
| 2007/0019072 | A1* | 1/2007 | Bengtsson | B64D 11/0015 |
| | | | | 348/148 |
| 2010/0073773 | A1* | 3/2010 | Hotta | G02B 27/01 |
| | | | | 359/630 |
| 2010/0149072 | A1 | 6/2010 | Waeller et al. | |
| 2011/0002038 | A1 | 1/2011 | Wang | |
| 2015/0025917 | A1* | 1/2015 | Stempora | G02B 27/0093 |
| | | | | 705/4 |
| 2015/0161738 | A1* | 6/2015 | Stempora | G06Q 40/08 |
| | | | | 705/4 |
| 2016/0075233 | A1* | 3/2016 | Chun | B60K 35/29 |
| | | | | 701/36 |
| 2017/0302913 | A1* | 10/2017 | Tonar | H04N 13/327 |
| 2018/0015825 | A1* | 1/2018 | Nania | G06V 20/597 |
| 2018/0174449 | A1* | 6/2018 | Nguyen | G08G 1/012 |
| 2019/0022347 | A1* | 1/2019 | Wan | A61B 5/18 |
| 2019/0094959 | A1* | 3/2019 | Tan | B60K 35/22 |
| 2019/0367050 | A1* | 12/2019 | Victor | G06V 20/597 |
| 2020/0067341 | A1* | 2/2020 | Glover | H02J 50/80 |
| 2021/0023948 | A1 | 1/2021 | Knittl et al. | |
| 2021/0089170 | A1 | 3/2021 | Datta et al. | |
| 2021/0101546 | A1* | 4/2021 | Diamond | G06T 7/70 |
| 2022/0334388 | A1* | 10/2022 | Dai | G06V 20/56 |
| 2023/0186509 | A1* | 6/2023 | Ryan | G06V 10/774 |
| | | | | 382/103 |
| 2023/0221569 | A1* | 7/2023 | Ohyama | B60K 35/235 |
| | | | | 701/523 |
| 2023/0375852 | A1* | 11/2023 | Chang | G02B 27/0093 |
| 2023/0406099 | A1 | 12/2023 | Chang et al. | |
| 2023/0408841 | A1 | 12/2023 | Seder et al. | |
| 2024/0064281 | A1 | 2/2024 | Sharma et al. | |
| 2024/0109413 | A1* | 4/2024 | Poornachandran | B60K 35/53 |
| 2025/0262939 | A1* | 8/2025 | Akachi | B60K 35/656 |

FOREIGN PATENT DOCUMENTS

| | | |
|---|---|---|
| DE | 112017007713 T5 | 3/2020 |
| DE | 102021117985 A1 | 1/2022 |
| DE | 102022201100 A1 | 9/2023 |
| DE | 102022128099 A1 | 11/2023 |
| DE | 202023107282 U1 | 2/2024 |
| KR | 20230065042 A | 5/2023 |

OTHER PUBLICATIONS

United States Patent and Trademark Office. U.S. Appl. No. 18/153,776, filed Jan. 12, 2023.
United States Patent and Trademark Office. U.S. Appl. No. 18/153,779, filed Jan. 12, 2023.
United States Patent and Trademark Office. U.S. Appl. No. 18/153,783, filed Jan. 12, 2023.
United States Patent and Trademark Office. U.S. Appl. No. 18/153,790, filed Jan. 12, 2023.
United States Patent and Trademark Office. U.S. Appl. No. 18/325,255, filed May 30, 2023.
United States Patent and Trademark Office. U.S. Appl. No. 18/363,226, filed Aug. 1, 2023.
United States Patent and Trademark Office. U.S. Appl. No. 18/483,163, filed Oct. 9, 2023.
Philipp, T., et al. U.S. Appl. No. 18/483,163, filed Oct. 9, 2023.
Seder, T., et al. U.S. Appl. No. 18/153,767, filed Jan. 12, 2023.
Seder, T., et al. U.S. Appl. No. 18/153,779, filed Jan. 12, 2023.
Seder, T., et al. U.S. Appl. No. 18/153,783, filed Jan. 12, 2023.
Seder, T., et al. U.S. Appl. No. 18/325,255, filed May 30, 2023.
Sharma, M., et al. U.S. Appl. No. 18/363,226, filed Aug. 1, 2023.
Szczerba, J., et al. U.S. Appl. No. 18/153,776, filed Jan. 12, 2023.
Szczerba, J., et al. U.S. Appl. No. 18/153,790, filed Jan. 12, 2023.

* cited by examiner

ENABLING VEHICLE DISPLAY INTERACTION AND PERSONALIZATION

INTRODUCTION

The present disclosure relates to a system for enabling interaction and personalization with a display within a vehicle.

Current entertainment systems within vehicles generally comprise a screen or monitor that is mounted within the vehicle for viewing by the passengers. Some systems include smaller individual screens, wherein each passenger has a screen for their personal viewing. Current systems are primarily designed for individual users and do not take into consideration shared or multi-display vehicle compartments where content is determined based on identity of the user. Further, shared displays do not account for users that move to different seating positions within a vehicle or move from one vehicle to another. In such circumstances, a user must manually terminate displayed content at the current seating position or within the current vehicle, and then manually re-start displayed content at the new seating position or within a different vehicle.

While current systems achieve their intended purpose, there is a need for a new and improved system for enabling personalization and interaction via a vehicle display.

SUMMARY

According to several aspects of the present disclosure, a system for enabling vehicle display and interaction, includes a vehicle display server positioned within a vehicle and in communication with a plurality of sensors positioned within the vehicle and adapted to track head and eye position and movement of users seated within a plurality of seating positions within the vehicle, detect locations of users within the vehicle and when users change seating positions within the vehicle, detect when a user enters and exits the vehicle, detect and interpret facial and gesture inputs from users within the vehicle, capture images of users within the vehicle, receive audio inputs from users within the vehicle, haptic feedback devices positioned within the vehicle and adapted to provide haptic feedback to users seated within the vehicle, and, a user display system positioned within the vehicle for viewing and interaction by users seated within the plurality of seating positions within the vehicle, the vehicle display server adapted to identify, using the plurality of sensors positioned within the vehicle, computer vision algorithms and stored data, an identity of a user seated at a one of the plurality of seating positions within the vehicle, select, using the identity of the user seated at the one of the plurality of seating positions within the vehicle, user specific content to be displayed for the user on the user display system, and automatically display the user specific content on the user display system for viewing by the user seated within the one of the plurality of seating positions within the vehicle.

According to another aspect, when a user seated at a first seating position within the vehicle moves to a second seating position within the vehicle, the vehicle display server is adapted to detect, with the plurality of sensors positioned within the vehicle, when the user leaves the first seating position within the vehicle, pause user specific content that is currently being displayed on the user display system for the first seating position, detect, with the plurality of sensors positioned within the vehicle, when the user sits at the second seating position within the vehicle, and, resume displaying the user specific content on the user display system for the second seating position.

According to another aspect, the user display system comprises one of a plurality of individual display screens adapted to display information and receive input from a user, one individual display screen associated with each of the plurality of seating positions within the vehicle, or, a single display system comprising at least one display for projecting an image, a plurality of reflectors, each reflector associated with a one of the plurality of seating positions within the vehicle and adapted to reflect a projected image to the associated one of the plurality of seating positions, such that a user seated at the associated one of the plurality of seating positions within the vehicle perceives the image floating at a central location within the vehicle, and, a transparent cylindrical touch screen display positioned between the plurality of seating positions within the vehicle and the plurality of reflectors and adapted to display user specific content for users at each of the plurality of seating positions within the vehicle and receive input from each of the users at each of the plurality of seating positions within the vehicle.

According to another aspect, the vehicle display server is adapted to identify, using the plurality of sensors positioned within the vehicle, when a user that is viewing the user display system looks away from the user display system, pause user specific content that is being displayed on the user display system, identify, using the plurality of sensors positioned within the vehicle, when the user returns to looking at the user display system, and, resume displaying the user specific content on the user display system.

According to another aspect, the system further includes a cloud-based host server in communication, via a wireless communication network, with the vehicle display server within the vehicle, the cloud-based host server further in communication with at least one remote vehicle, the remote vehicle having a vehicle display server in communication with the cloud-based host server, a plurality of sensors, haptic feedback devices, a plurality of seating positions and a user display system substantially identical to the corresponding features of the vehicle.

According to another aspect, when a user seated within the vehicle exits the vehicle and moves to a one of the at least one remote vehicle, the vehicle display server within the vehicle is adapted to detect, with the plurality of sensors positioned within the vehicle, when the user leaves the vehicle, and, pause user specific content that is currently being displayed on the user display system within the vehicle, and the vehicle display server within the one of the at least one remote vehicle is adapted to detect, with the plurality of sensors positioned within the one of the at least one remote vehicle, when the user enters the one of the at least one remote vehicle, identify, using the plurality of sensors positioned within the one of the at least one remote vehicle, computer vision algorithms and stored data, an identity of the user, obtain, via communication with the host server, information related to the user specific content that the user was viewing in the vehicle prior to exiting the vehicle, and, automatically resume displaying the user specific content on the user display system within the one of the at least one remote vehicle into which the user entered.

According to another aspect, the host server is adapted to coordinate the vehicle display server and the user display system positioned within the vehicle and being viewed by a first user with a vehicle display server and user display system positioned within a one of the at least one remote vehicle and being viewed by a second user and facilitate communication and interaction between the first user and the second user.

According to another aspect, the host server is in communication with a personal device of a user, and when the user is viewing user specific content on the user display system within the vehicle and the user exits the vehicle, the host server is adapted to detect, with the plurality of sensors positioned within the vehicle via communication with the vehicle display server within the vehicle, when the user leaves the vehicle, automatically pause the user specific content that is currently being displayed on the user display system within the vehicle, and automatically resume displaying the user specific content on the personal device of the user, and when the user is viewing user specific content on the personal device and the user enters the vehicle, the host server is adapted to detect, with the plurality of sensors positioned within the vehicle via communication with the vehicle display server within the vehicle, when the user enters the vehicle, automatically prompt the user with the option to selectively pause the user specific content that is currently being displayed on the personal device, and, resume displaying the user specific content on the user display system within the vehicle.

According to another aspect, for the user display system comprising a single display system, the plurality of reflectors comprises a plurality of transparent beam splitters, one transparent beam splitter individually associated with each one of the plurality of seating positions within the vehicle, each beam splitter adapted to receive an image from the at least one display and to reflect the image to the associated one of the plurality of seating positions, wherein, a user seated at the associated one of the plurality of seating positions within the vehicle perceives the image floating at a central location within the vehicle.

According to another aspect, for the user display system comprising a single display system, further includes an image chamber including at least one display adapted to project an image, a reflector individually associated with each one of the plurality of seating positions within the vehicle and adapted to reflect the image to the associated one of the plurality of seating positions within the vehicle, such that a user seated at the associated one of the plurality of seating positions within the vehicle perceives the image floating at a central location within the vehicle, transparent portions adapted to allow the image reflected by the reflector to pass from the image chamber outward toward a user seated at the associated one of the plurality of seating positions, and solid portions adapted to prevent light from entering the image chamber behind the reflector, and, the transparent cylindrical touch screen display positioned between the reflectors of the image chamber and the plurality of seating positions within the vehicle, and adapted to display information to users seated at the plurality of seating locations within the vehicle within an image plane positioned in front of the perceived image floating at the central location within the vehicle.

According to another aspect, the user display system is adapted to monitor, using the plurality of sensors within the vehicle, a position of a head and eyes of a user, display information at a specific location on the transparent cylindrical touch screen display based on a position of the head and eyes of the user, and, display information at a specific location on the transparent cylindrical touch screen display based on the position of the head and eyes of the user relative to the perceived image, such that information displayed on the transparent cylindrical touch screen display is properly positioned relative to the perceived image.

According to another aspect, when using the identity of the user seated at the position within the vehicle to select user specific content to be displayed for the user, the vehicle display server is adapted to access stored historical data of past content viewed by the user, select user specific content based on contextual information, prompt the user to selectively resume viewing content that the user was previously viewing on a different user display system, and, prompt a user to selectively view content that is already being viewed by other users within the same vehicle.

According to several aspects of the present disclosure, a method for enabling vehicle display and interaction, includes, with a vehicle display server positioned within a vehicle and in communication with a plurality of sensors positioned within the vehicle, tracking head and eye position and movement of users seated within a plurality of seating positions within the vehicle, detecting locations of users within the vehicle and when users change seating positions within the vehicle, detecting when a user enters and exits the vehicle, detecting and interpreting facial and gesture inputs from users within the vehicle, capturing images of users within the vehicle, and receiving audio inputs from users within the vehicle, providing, with haptic feedback devices positioned within the vehicle and in communication with the vehicle display server, haptic feedback to users seated within the vehicle, and, identifying, using the plurality of sensors positioned within the vehicle, computer vision algorithms and stored data, an identity of a user seated at one of the plurality of seating positions within the vehicle, selecting, using the identity of the user seated at the one of the plurality of seating positions within the vehicle, user specific content to be displayed on the user display system for the user seated at the one of the plurality of seating positions, and automatically displaying, with the user display system positioned within the vehicle for viewing and interaction by a user seated at the one of the plurality of seating positions, the user specific content.

According to another aspect, when a user seated at the first position within the vehicle moves to the second position within the vehicle, the method further includes detecting, with the vehicle display server and the plurality of sensors positioned within the vehicle, when the user leaves the first seating position within the vehicle, pausing, with the vehicle display server, user specific content that is currently being displayed on the first user display system for the user at the first seating position, detecting, with the vehicle display server and the plurality of sensors positioned within the vehicle, when the user sits at the second seating position within the vehicle, and resuming, with the vehicle display server, display of the user specific content on the user display system for the user at the second seating position.

According to another aspect, the displaying of the user specific content on the user display system further includes one of displaying user specific content on a user display system comprising a plurality of individual display screens adapted to display information and receive input from a user, one individual display screen associated with each of the plurality of seating positions within the vehicle, or, displaying user specific content on a user display system comprising a single display system including at least one display for projecting an image, a plurality of reflectors, each reflector associated with a one of the plurality of seating positions within the vehicle and adapted to reflect a projected image to the associated one of the plurality of seating positions, such that a user seated at the associated one of the plurality of seating positions within the vehicle perceives the image floating at a central location within the vehicle, and a transparent cylindrical touch screen display positioned between the plurality of seating positions within the vehicle and the plurality of reflectors and adapted to display user specific content for users at each of the plurality of seating positions within the vehicle and receive input from each of the users at each of the plurality of seating positions within the vehicle.

According to another aspect, the method further includes, with the vehicle display server, identifying, with the plurality of sensors positioned within the vehicle, when a user that is viewing the user display systems looks away from the user display system, pausing user specific content that is being displayed on the user display system, identifying, using the plurality of sensors positioned within the vehicle, when the user returns to looking at the user display system, and, resuming display of the user specific content on the user display system.

According to another aspect, wherein the system further includes a cloud-based host server in communication, via a wireless communication network, with the vehicle display server within the vehicle, the cloud-based host server further in communication with at least one remote vehicle, the remote vehicle having a vehicle display server in communication with the cloud-based host server, a plurality of sensors, haptic feedback devices, a plurality of seating positions and a user display system substantially identical to the corresponding features of the vehicle, the method further includes, when a user seated within the vehicle exits the vehicle and moves to a one of the at least one remote vehicle, detecting, with the vehicle display server and the plurality of sensors positioned within the vehicle, when the user leaves the vehicle, pausing, with the vehicle display server within the vehicle, user specific content that is currently being displayed on the user display system within the vehicle, detecting, with the vehicle display server and the plurality of sensors positioned within the one of the at least one remote vehicle, when the user enters the one of the at least one remote vehicle, and identifying, using the vehicle display server and the plurality of sensors positioned within the one of the at least one remote vehicle, computer vision algorithms and stored data, an identity of the user, obtaining, with the vehicle display server within the one of the at least one remote vehicle, via communication with the host server, information related to the user specific content that the user was viewing in the vehicle prior to exiting the vehicle, and, automatically resuming display of the user specific content on the user display system within the one of the at least one remote vehicle into which the user entered.

According to another aspect, the method further includes coordinating, with the host server, the vehicle display server and the user display system positioned within the vehicle and being viewed by a first user seated within the vehicle with the vehicle display server and user display system positioned within a one of the at least one remote vehicle and being viewed by a second user, and facilitating, with the host server, communication and interaction between the first user and the second user.

According to another aspect, wherein the host server is in communication with a personal device of a user, the method further includes when the user is viewing user specific content on the user display system within the vehicle and the user exits the vehicle, detecting, with the host server and the plurality of sensors positioned within the vehicle via communication with the vehicle display server within the vehicle, when the user leaves the vehicle, automatically pausing, with the host server, the user specific content that is currently being displayed on the user display system within the vehicle, and, automatically resuming, with the host server, displaying the user specific content on the personal device of the user, and when the user is viewing user specific content on the personal device and the user enters the vehicle, detecting, with the host server and the plurality of sensors positioned within the vehicle via communication with the vehicle display server within the vehicle, when the user enters the vehicle, automatically prompting, with the host server, the user with the option to selectively pause the user specific content that is currently being displayed on the personal device, and resume displaying the user specific content on the user display system within the vehicle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1:
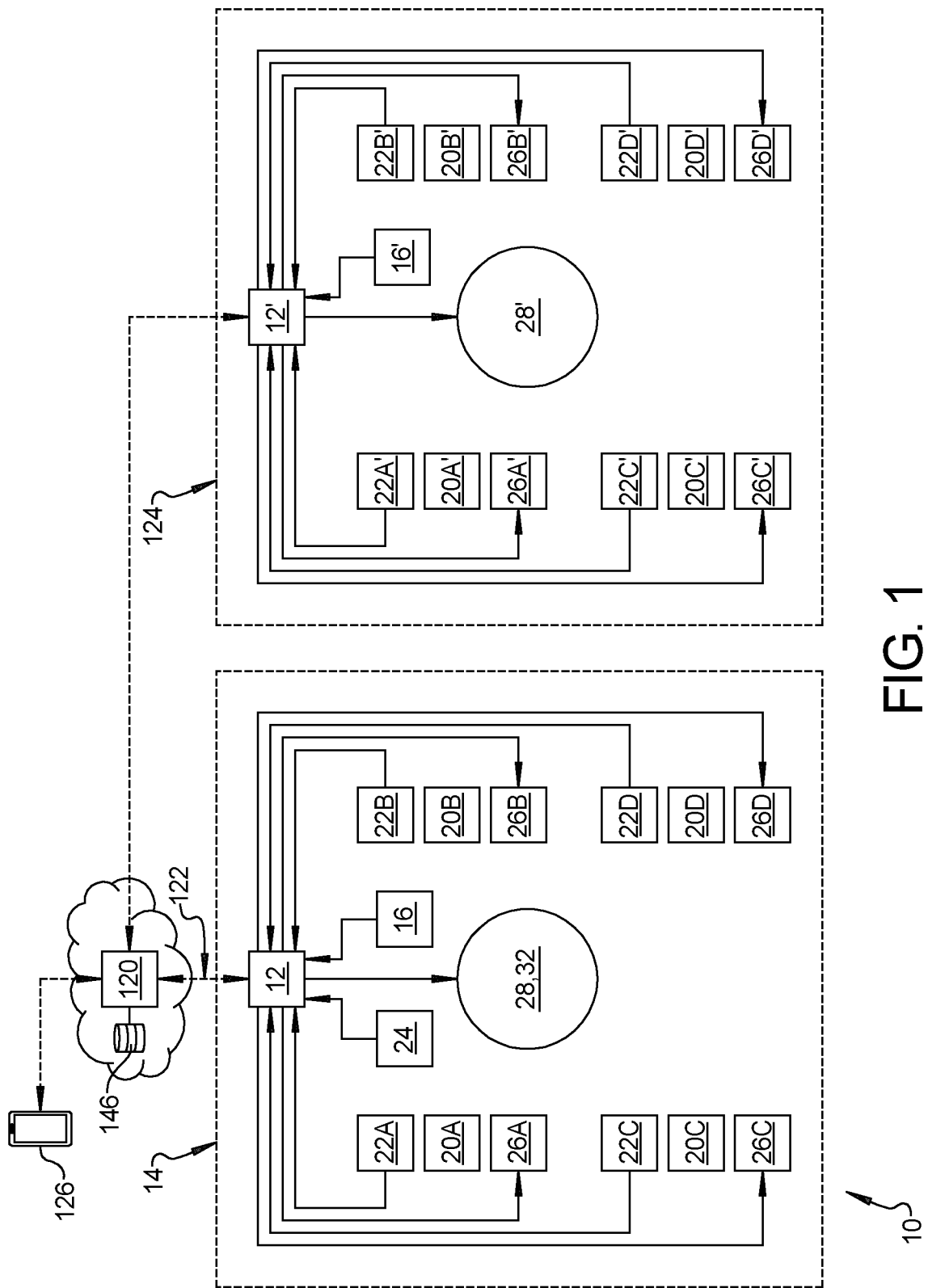
FIG. 1 is a schematic view of a system in accordance with an exemplary embodiment of the present disclosure.

The figures are not necessarily to scale, and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

Referring to FIG. 1, a system 10 for enabling vehicle display and interaction includes a vehicle display server 12 positioned within a vehicle 14 and in communication with a plurality of sensors 16 positioned within the vehicle 14. The plurality of sensors 16 sense observable conditions of the exterior environment and the interior environment of the vehicle 14. The plurality of sensors 16 can include, but are not limited to, radars, lidars, global positioning systems, optical cameras, thermal cameras, ultrasonic sensors, pressure sensors and/or other sensors. The cameras can include two or more digital cameras spaced at a selected distance from each other, in which the two or more digital cameras are used to obtain stereoscopic images of the surrounding environment in order to obtain a three-dimensional image or map. The plurality of sensors 16 is used to determine information about an environment surrounding the vehicle 14. In an exemplary embodiment, the plurality of sensors 16 includes at least one of a motor speed sensor, a motor torque sensor, an electric drive motor voltage and/or current sensor, an accelerator pedal position sensor, a coolant temperature sensor, a cooling fan speed sensor, and a transmission oil temperature sensor. In another exemplary embodiment, the plurality of sensors 16 further includes sensors to determine information about the environment surrounding the vehicle 14, for example, an ambient air temperature sensor, a barometric pressure sensor, and/or a photo and/or video camera which is positioned to view the environment in front of the vehicle 14. In another exemplary embodiment, at least one of the plurality of sensors 16 is capable of measuring distances in the environment surrounding the vehicle 14.

In a non-limiting example, wherein the plurality of sensors 16 includes a camera, the plurality of sensors 16 measures distances using an image processing algorithm configured to process images from the camera and determine distances between objects. In another non-limiting example, the plurality of sensors 16 includes a stereoscopic camera having distance measurement capabilities. In one example, at least one of the plurality of sensors 16 is affixed inside of the vehicle 14, for example, in a headliner of the vehicle 14, having a view through the windshield of the vehicle 14. In another example, at least one of the plurality of sensors 16 is a camera affixed outside of the vehicle 14, for example, on a roof of the vehicle 14, having a view of the environment surrounding the vehicle 14 and adapted to collect information (images) related to the environment outside the vehicle 14.

In an exemplary embodiment, the plurality of sensors 16 includes cameras and sensors adapted to capture images of and detect/monitor movement of users 18 seated within the vehicle 14. Such sensors 16 may include pressure sensors within a plurality of seating positions 20A, 20B, 20C, 20D within the vehicle 14 to determine if a user 18 is seated within a particular seating position 20A, 20B, 20C, 20D within the vehicle 14. Such sensors 16 may also include cameras adapted to capture images of users 18 within the vehicle 14 and, using computer vision algorithms and software, use such captured images to determine movement of users 18 within the vehicle 14 and identity of users 18 within the vehicle 14. Such sensors 16 may be incorporated into monitoring systems adapted to monitor the eyes and head orientation/movement of users 18 within the vehicle 14 to determine gaze direction of a user 18 or when a user 18 is not fully alert or distracted. It should be understood that various additional types of sensing devices, such as, for example, LiDAR sensors, ultrasonic ranging sensors, radar sensors, and/or time-of-flight sensors are within the scope of the present disclosure.

Figure 2:
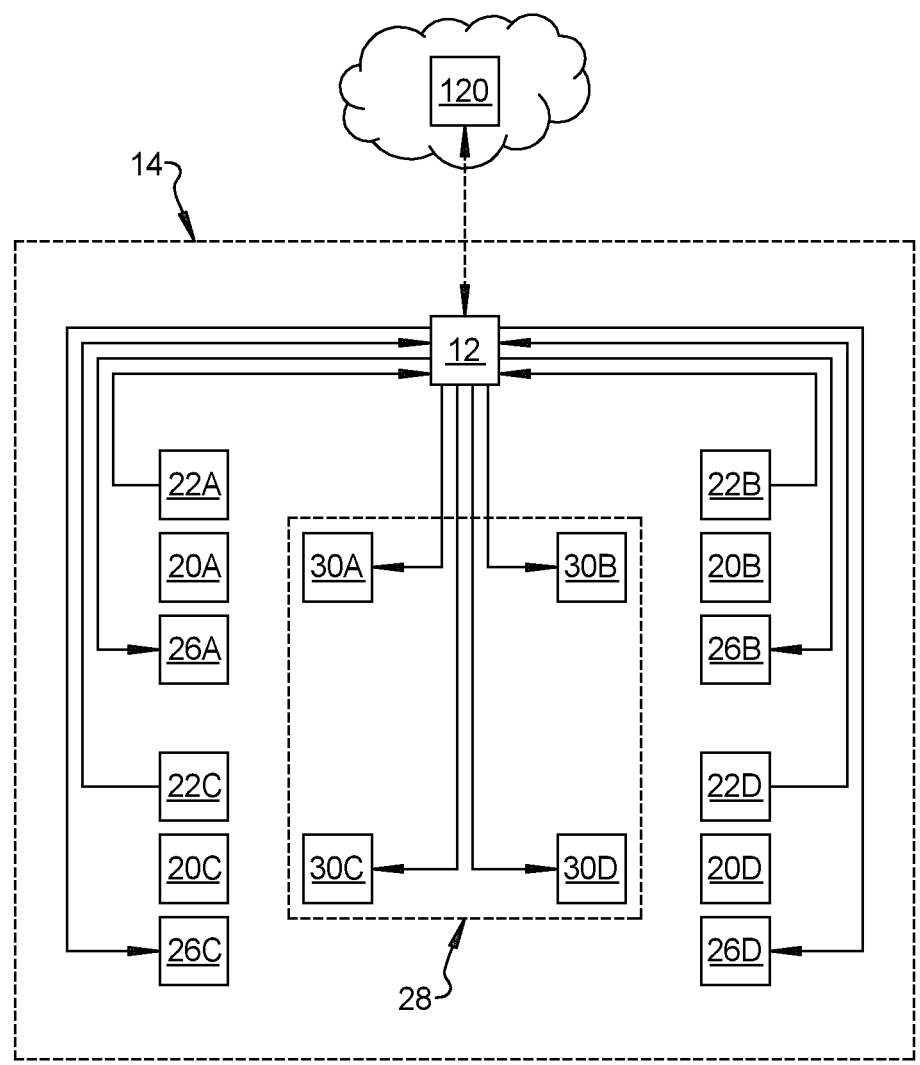
FIG. 2 is a schematic view of the system shown in FIG. 1, wherein the vehicle display system include a plurality of individual touch screen displays.
Figure 3:
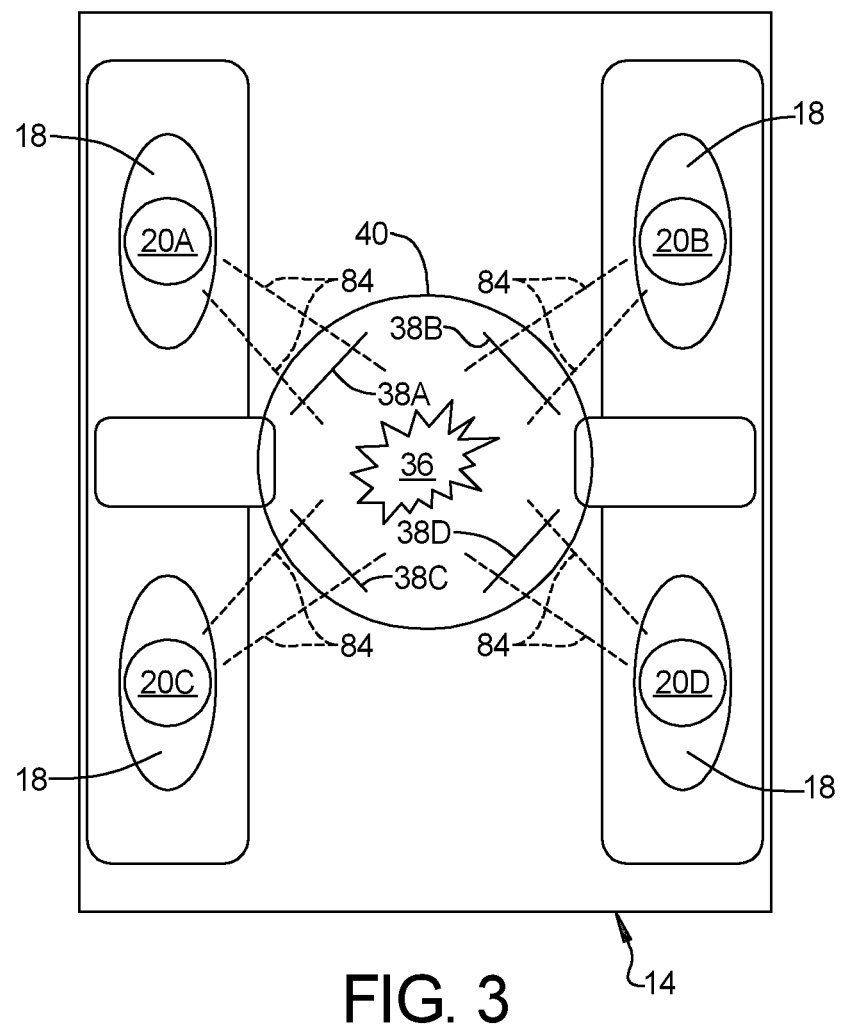
FIG. 3 is a schematic top view of a vehicle having a system in accordance with the present disclosure.

In an exemplary embodiment, the vehicle 14 includes a plurality of seating positions 20A, 20B, 20C, 20D adapted to accommodate a user 18 seated therein. Referring to FIG. 1, FIG. 2, and FIG. 3, as shown, the vehicle 14 includes a first seating position 20A, a second seating position 20B, a third seating position 20C and a fourth seating position 20D. It should be understood that the vehicle 14 could include more or less than four seating positions. The plurality of sensors 16 includes, at least, a first occupant monitoring camera 22A for monitoring head and eye position and movement of a user 18 seated within the first seating position 20A, a second occupant monitoring camera 22B for monitoring head and eye position and movement of a user 18 seated within the second seating position 20B, a third occupant monitoring camera 22C for monitoring head and eye position and movement of a user 18 seated within the third seating position 20C, and a fourth occupant monitoring camera 22D for monitoring head and eye position and movement of a user 18 seated within the fourth seating position 20D within the vehicle 14.

The first, second, third and fourth occupant monitoring cameras 22A, 22B, 22C, 22D are adapted to, along with other sensors within the vehicle 14, continuously track head and eye position and movement of users 18 seated within the plurality of seating positions 20A, 20B, 20C, 20D within the vehicle 14 and detect the locations of users 18 within the vehicle 14 and when users 18 change seating positions within the vehicle 14. The first, second, third and fourth occupant monitoring cameras 22A, 22B, 22C, 22D, and/or other of the plurality of sensors 16 within the vehicle 14, are adapted to detect when a user 18 enters and exits the vehicle 14, detect and interpret facial and gesture inputs from users 18 within the vehicle 14, capture images of users 18 within the vehicle 14, and receive audio inputs from users 18 within the vehicle 14, wherein the plurality of sensors 16 includes at least one microphone 24 within the vehicle 14.

Images, audio and data collected by the plurality of sensors 16, 22A, 22B, 22C, 22D, 24 is communicated back to the vehicle display server 12. The vehicle display server 12 is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

The vehicle display server 12 is further in communication with haptic feedback devices 26A, 26B, 26C, 26D positioned within the vehicle 14 and adapted to provide haptic feedback to users 18 seated within the vehicle 14. Haptic feedback devices 26A, 26B, 26C, 26D may be actuators mounted within surfaces of the interior of the vehicle 14 or vehicle seats and adapted to provide feedback that can be felt by a user. As shown, the vehicle includes first haptic feedback devices 26A that are adapted to provide haptic feedback to a user 18 seated within the first seating position 20A, second haptic feedback devices 26B that are adapted to provide haptic feedback to a user 18 seated within the second seating position 20B, third haptic feedback devices 26C that are adapted to provide haptic feedback to a user 18 seated within the third seating position 20C, and fourth haptic feedback devices 26D that are adapted to provide haptic feedback to a user 18 seated within the fourth seating position 20D within the vehicle 14.

The vehicle display server 12 is further in communication with a user display system 28 positioned within the vehicle 14 for viewing and interaction by users 18 seated within the plurality of seating positions 20A, 20B, 20C, 20D within the vehicle 14. The user display system 28 provides video and audio output to the users 18 within the vehicle 14, allowing users 18 to view media accounts, watch movies, view augmented images of the environment outside the vehicle 14, or play games with other users 18 within the vehicle 14 our within other remote vehicles.

In an exemplary embodiment, the user display system 28 comprises one of 1) a plurality of individual display screens 30A, 30B, 30C, 30D adapted to display information and receive input from a user 18, one individual display screen 30A, 30B, 30C, 30D associated with each of the plurality of seating positions 20A, 20B, 20C, 20D within the vehicle 14, or 2) the user display system 28 comprises a single display system 32 including at least one display 34 for projecting an image 36, a plurality of reflectors 38A, 38B, 38C, 38D, each of the plurality of reflectors 38A, 38B, 38C, 38D associated with a one of the plurality of seating positions 20A, 20B, 20C, 20D within the vehicle 14 and adapted to reflect a projected image 36 to the associated one of the plurality of seating positions 20A, 20B, 20C, 20D, such that a user 18 seated at the associated one of the plurality of seating positions 20A, 20B, 20C, 20D within the vehicle 14 perceives the image 36 floating at a central location within the vehicle 14, and a transparent cylindrical touch screen display 40 positioned between the plurality of seating positions 20A, 20B, 20C, 20D within the vehicle 14 and the plurality of reflectors 38A, 38B, 38C, 38D and adapted to display user specific content for users 18 at each of the plurality of seating positions 20A, 20B, 20C, 20D within the vehicle 14 and receive input from each of the users 18 at each of the plurality of seating positions 20A, 20B, 200, 20D within the vehicle 14.

Referring to FIG. 2, in an exemplary embodiment the user display system 28 includes a plurality of individual display screens 30A, 30B, 30C, 30D adapted to display information and receive input from a user 18. As shown in FIG. 2, the vehicle 14 includes the first, second, third and fourth seating positions 20A, 20B, 20C, 20D, and a first individual display screen 30A is associated with the first seating position 20A for viewing by a user 18 seated within the first seating position 20A, a second individual display screen 30B is associated with the second seating position 20B for viewing by a user 18 seated within the second seating position 20B, a third individual display screen 30C is associated with the third seating position 20C for viewing by a user 18 seated within the third seating position 20C, and a fourth individual display screen 30D is associated with the fourth seating position 20D for viewing by a user 18 seated within the fourth seating position 20D. As users 18 move around within the vehicle 14 and sit at the first, second, third and fourth seating positions 20A, 20B, 20C, 20D, and possibly at positions between the first, second, third and fourth seating positions 20A, 20B, 20C, 20D, the system 10 will use the plurality of sensors 16, including the first, second, third and fourth occupant monitoring cameras 22A, 22B, 22C, 22D to determine which of the plurality of individual display screens 30A, 30B, 30C, 30D is best positioned to provide viewing for a particular user 18 based on the exact position of the user 18 relative to the plurality of individual display screens 30A, 30B, 30C, 30D and the user's 18 eye position and gaze angle relative to the plurality of individual display screens 30A, 30B, 30C, 30D.

The first, second, third and fourth individual display screens 30A, 30B, 30C, 30D are adapted to display visual content for users 18 and to allow users 18 to provide input to the system 10. In an exemplary embodiment, the first, second, third and fourth individual display screens 30A, 30B, 30C, 30D include a touch screen features that allow a user 18 to interact with the system 10 and with the displayed content by manually touching the first, second, third and fourth individual display screens 30A, 30B, 300, 30D. It should be understood that the first, second, third and fourth individual display screens 30A, 30B, 30C, 30D of the exemplary embodiment shown in FIG. 2, may be any known type of display screen adapted for use within a vehicle 14, with or without touch screen features, without departing from the scope of the present disclosure.

Referring again to FIG. 1 and to FIG. 3, in another exemplary embodiment, the user display system 28 comprises a single display system 32 including at least one display 34 for projecting an image 36, a plurality of reflectors 38A, 38B, 38C, 38D, each of the plurality of reflectors 38A, 38B, 38C, 38D associated with a one of the plurality of seating positions 20A, 20B, 20C, 20D within the vehicle 14 and adapted to reflect a projected image 36 to the associated one of the plurality of seating positions 20A, 20B, 20C, 20D, such that a user 18 seated at the associated one of the plurality of seating positions 20A, 20B, 20C, 20D within the vehicle 14 perceives the image 36 floating at a central location within the vehicle 14, and a transparent cylindrical touch screen display 40 positioned between the plurality of seating positions 20A, 20B, 20C, 20D within the vehicle 14 and the plurality of reflectors 38A, 38B, 38C, 38D and adapted to display user specific content for users 18 at each of the plurality of seating positions 20A, 20B, 20C, 20D within the vehicle 14 and receive input from each of the users 18 at each of the plurality of seating positions 20A, 20B, 20C, 20D within the vehicle 14.

Figure 4:
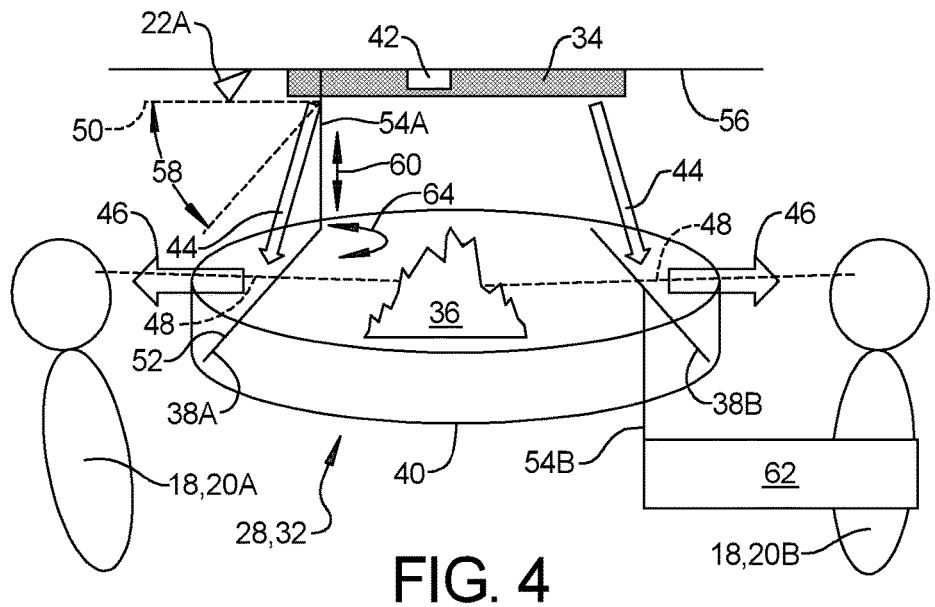
FIG. 4 is a schematic side view of a vehicle display system having display, a plurality of beam splitters and a cylindrical touch screen display.

Referring to FIG. 3 and FIG. 4, in an exemplary embodiment, the user display system 28, 32 includes at least one display 34 that is adapted to project a plurality of three-dimensional images and a plurality of reflectors 38A, 38B, 38C, 38D, wherein the reflectors 38A, 38B, 38C, 38D are transparent beam splitters. One reflector/beam splitter 38A, 38B, 38C, 38D individually associated with each one of the plurality of seating positions 20A, 20B, 20C, 20D within the vehicle 14. For detailed description herein, FIG. 4 is an side schematic side view illustration of only the first seating position 20A and the second seating position 20B of the vehicle 14 shown in FIG. 1 and FIG. 3. The plurality of three-dimensional images may be generated via holographic method, pre-computed and encoded into a hologram generator 42 within the at least one display 34.

The transparent cylindrical touch screen display 40 is positioned between the first, second, third and fourth seating positions 20A, 20B, 20C, 20D and the perceived image 36 floating at the central location within the vehicle 14. The transparent cylindrical touch screen display 40 is adapted to allow users 18 seated within the first, second, third and fourth seating positions 20A, 20B, 20C, 20D to receive annotated information and to provide input to the system 10. As shown, the transparent cylindrical touch screen display 40 encircles the floating image 36, and is thereby positioned between the eyes of users 18 seated within the first, second, third and fourth seating positions 20A, 20B, 20C, 20D and the perceived image 36 floating at the central location within the vehicle 14. In an exemplary embodiment, the transparent cylindrical touch screen display 40 is an organic light-emitting diode (OLED). It should be understood, that the transparent cylindrical touch screen display 40 may be other types of transparent touch screen displays known in the art.

The transparent cylindrical touch screen display 40 is adapted to present visible displayed information only to a user 18 that is seated within one of the first, second, third and fourth seating positions 20A, 20B, 20C, 20D, wherein, the content displayed, for example, for a user seated within the first seating position 20A is only visible by the user 18 seated within the first seating position 20A and is different from content displayed for other seating positions within the vehicle 14.

Referring again to FIG. 4, the at least one display 34 is adapted to project the plurality of three-dimensional images to one of the plurality of reflectors/beam splitters 38A, 38B, 38C, 38D, as indicated by arrows 44. Each of the plurality of reflector/beam splitters 38A, 38B, 38C, 38D is adapted to receive one of the plurality of three-dimensional images from the display 34 and to reflect the one of the plurality of three-dimensional images from the display 34 to a user 18 seated at one of the plurality of seating positions 20A, 20B, 200, 20D, as indicated by arrows 46. Users at each of the plurality of seating positions 20A, 20B, 20C, 20D perceives the floating image 36 at a location centrally located within the vehicle 14, as indicated by lines 48.

Each of the plurality of reflectors/beam splitters 38A, 38B, 38C, 38D and the transparent cylindrical touch screen display 40 is transparent, wherein a user 18 can see through the reflector/beam splitter 38A, 38B, 38C, 38D and the transparent cylindrical touch screen display 40, as indicated at 48. This allows users 18 to perceive the floating image 36 at a distance beyond the reflectors/beam splitters 38A, 38B, 38C, 38D and further, allows the users 18 to see through the reflectors/beam splitters 38A, 38B, 38C, 38D and able to see the interior of the vehicle compartment and other users therein.

As shown in FIG. 4, the reflector/beam splitter 38A is shown, wherein the reflector/beam splitter 38A is moveable between a retracted position 50 and an extended position 52. In an exemplary embodiment, the reflector/beam splitter 38A is mounted onto a support shaft 54A that hangs down from the roof 28 of the vehicle compartment. In the retracted position 50, the reflector/beam splitter 38A is positioned adjacent to the display 34 and parallel to the roof 56 of the vehicle compartment. The reflector/beam splitter 38A is pivotal relative to the support shaft 54A, as indicated by arrow 58, and the support shaft 54A is extendable vertically up and down, as indicated by arrow 60. From the retracted position 50, the reflector/beam splitter 38A is pivoted down, and the support shaft 54A is extended downward to place the reflector/beam splitter 38A in the extended position 52 for use. When in the extended position 52, the reflector/beam splitter 38A is in operational proximity to the display 34 and a user 18 seated within the first seating position 20A.

Referring again to FIG. 4, the reflector/beam splitter 38B is shown, wherein the reflector/beam splitter 38B is mounted onto an armrest 62 next to the user 18 seated in the second seating position 20B. The reflector/beam splitter 38B is attached to a support shaft 54B that is attached to the armrest 62. While not shown, the reflector/beam splitter 38B supported on the armrest 62 may also be moveable from a retracted position to an extended position. In one exemplary embodiment, the reflector/beam splitter 38B is stowed within the armrest 62 when in the retracted position.

In an exemplary embodiment, an orientation of each of the plurality of reflectors/beam splitters 38A, 38B, 38C, 38D is fixed. Thus, when the reflectors/beam splitters 38A, 38B, 38C, 38D are in the extended position 52 angular orientation vertically and horizontally relative to the support shaft 54A, 54B is fixed. Alternatively, in another exemplary embodiment, an orientation of each of the plurality of reflectors/beam splitters 38A, 38B, 38C, 38D is adjustable. The reflector/beam splitter 38A, 38B, 38C, 38D may be pivotally mounted onto the support shaft 54A, 54B wherein the reflector/beam splitter 38A, 38B, 38C, 38D is pivotal horizontally, as indicated by arrow 64, and further, the reflector/beam splitter 38A, 38B, 38C, 38D may be pivotally mounted onto the support shaft 54A, 54B wherein the beam splitter 38A, 38B, 38C, 38D is vertically pivotal. Adjustability of the reflector/beam splitter 38A, 38B, 38C, 38D allows the reflector/beam splitter 38A, 38B, 38C, 38D to be positioned according to the position of the user 18 seated within the associated one of the plurality of seating positions 20A, 20B, 20C, 20D within the vehicle 14, and according to the height of the user 18, ensuring that the system 10 can be customized to accommodate users of different size and seating position/orientation preferences. In addition, adjustability of the orientation of the reflector/beam splitter 38A, 38B, 38C, 38D allows the perceived location of the floating image 36 to be adjusted according to the user's preferences.

In an exemplary embodiment, each of the plurality of reflectors/beam splitters 38A, 38B, 38C, 38D is in communication with the occupant monitoring cameras 22A, 22B, 22C, 22D associated with each of the seating positions 20A, 20B, 20C, 20D, wherein an orientation of each of the plurality of reflectors/beam splitters 38A, 38B, 38C, 38D changes automatically in response to movement of the head and eyes of a user 18 seated within the associated seating position 20A, 20B, 20C, 20D.

Further details about the user display system 28, 32 shown in FIG. 4 are disclosed within U.S. patent application Ser. No. 17/842,272, Publication No. US-2023-0408841-A1, filed on Jun. 16, 2022 and entitled "MULTI-PERSPECTIVE THREE-DIMENSIONAL FLOATING IMAGE DISPLAY WITH TOUCH FUNCTION", which is hereby incorporated by reference, in its' entirety, into the present disclosure.

Figure 5:
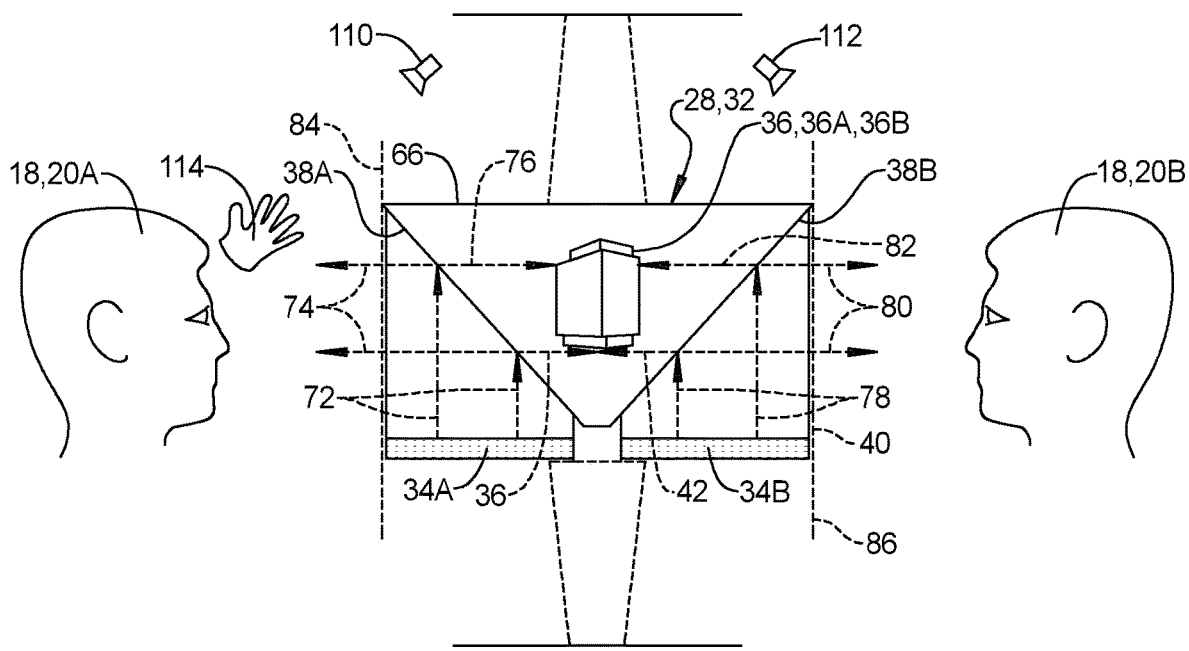
FIG. 5 is a schematic side view of a vehicle display system having an image chamber including a display, a plurality of reflectors and a cylindrical touch screen display.

Referring to FIG. 3 and FIG. 5, in another exemplary embodiment the user display system 28 comprising a single display system 32, further includes an image chamber 66 including the at least one display 34 adapted to project an image 36 and a plurality of reflectors 38A, 38B, 38C, 38D, one reflector individually associated with each one of the plurality of seating positions 20A, 20B, 20C, 20D within the vehicle 14 and adapted to reflect the image 36 to the associated one of the plurality of seating positions 20A, 20B, 200, 20D within the vehicle 14, such that a user 18 seated at the associated one of the plurality of seating positions 20A, 20B, 20C, 20D within the vehicle 14 perceives the image 36 floating at a central location within the vehicle 14. The image chamber 66 includes transparent portions 68 adapted to allow the image 36 reflected by the reflectors 38A, 38B, 38C, 38D to pass from the image chamber 66 outward toward a user 18 seated at the associated one of the plurality of seating positions 20A, 20B, 20C, 20D. The image chamber 66 further includes solid portions 70 adapted to prevent light from entering the image chamber 66 behind the reflectors 38A, 38B, 38C, 38D.

The transparent cylindrical touch screen display 40 is positioned between the reflectors 38A, 38B, 38C, 38D of the image chamber 66 and the plurality of seating positions 20A, 20B, 20C, 20D within the vehicle 14, and adapted to display information to users 18 seated at the plurality of seating locations 20A, 20B, 20C, 20D within the vehicle 14 within an image plane 48, 50 positioned in front of the perceived image 36 floating at the central location within the vehicle 14.

Referring to FIG. 5, the image chamber 66 that includes a first display 34A that is adapted to project a first three-dimensional image 36A and a first reflector 38A individually associated with the first display 34A and a user 18 within the first seating position 20A, and a second display 34B that is adapted to project a second three-dimensional image 36B and a second reflector 38B individually associated with the second display 34B and a user 18 within the second seating position 20B. As shown in FIG. 5, for purposes of description herein, the user display system 28, 32 is shown only with the first and second seating positions 20A, 20B and first and second displays 34A, 34B, and first and second reflectors 38A, 38B. It should be understood that the user display system 28, 32 may be adapted to accommodate any suitable number of users 18 and corresponding seating positions 20A, 20B, 20C, 20D, such as shown in FIG. 3.

Referring to FIG. 3, the vehicle includes first, second, third and fourth seating positions 20A, 20B, 20C, 20D. Each reflector 38A, 38B, 38C, 38D is adapted to be viewed by a user 18 seated within one of the first, second, third and fourth seating positions 20A, 20B, 20C, 20D. Each reflector 38A, 38B, 38C, 38D is adapted to receive an image 36 from the associated display 34, and to reflect the image 36 to the associated seating position 20A, 20B, 20C, 20D for viewing by a user 18 seated therein. The users 18 perceive the image 36 floating at a central location within the image chamber 66.

Referring again to FIG. 5, the first reflector 38A is adapted to receive the first image 36A from the first display 34A, as indicated by arrows 72, and to reflect the first image 36A to the user 18 within the first seating position 20A, as indicated by arrows 74, wherein the user 18 within the first seating position 20A perceives the first image 36A floating at a central location within the image chamber 66, as indicated by arrows 76. The second reflector 38B is adapted to receive the second image 36B from the second display 34B, as indicated by arrows 78, and to reflect the second image 36B to the user 18 within the second seating position 20B, as indicated by arrows 80, wherein, the user 18 within the second seating position 20B perceives the second image 36B floating at the central location within the image chamber 66, as indicated by arrows 82.

Referring again to FIG. 3, each of the users 18 seated at the first, second, third and fourth seating positions 20A, 20B, 20C, 20D perceives an image 36 reflected to them by respective associated reflectors 38A, 38B, 38C, 38D and the users 18 perceive the image 36 reflected to them within the image chamber 66, as indicated by lines 84. Each of the displays 34 can project the same image 36 to each of the reflectors 38A, 38B, 38C, 38D and thus to each of the users at the first, second, third and fourth seating positions 20A, 20B, 20C, 20D. Alternatively, each of the displays 34 can display a different perspective of the same image, or a different image altogether to each of the reflectors 38A, 38B, 38C, 38D. Thus the system 10 is capable of presenting the same floating image 36 to all of the seating positions 20A, 20B, 20C, 20D, so users 18 can view simultaneously, or alternatively, each user 18 at each seating position 20A, 20B, 20C, 20D can view a different perspective of the floating image 36 or a completely different three-dimensional image.

The transparent cylindrical touch screen display 40 is positioned between the plurality of seating positions 20A, 20B, 20C, 20D and the reflectors 38A, 38B, 38C, 38D. The transparent cylindrical touch screen display 40 is adapted to display information to the users 18 within an image plane 84, 86 positioned in front of the perceived first and second images 36A, 36B floating at the central location within the image chamber 66. The transparent cylindrical touch screen display 40 presents information to the user 18 seated within the first seating position 20A that appears within a first image plane 84, wherein information displayed on the transparent cylindrical touch screen display 40 to the user 18 within the first seating position 20A appears in front of the image 36A perceived by the user 18 within the first seating position 20A within the image chamber 66. The transparent cylindrical touch screen display 40 presents information to the user 18 within the second seating position 20B that appears within a second image plane 86, wherein information displayed on the transparent cylindrical touch screen display 40 to the user 18 within the second seating position 20B appears in front of the image 36B perceived by the user 18 within the second seating position 20B within the image chamber 66.

The transparent cylindrical touch screen display 40 is adapted to allow the users 18 seated within the plurality of seating positions 20A, 20B, 200, 20D to receive annotated information and to provide input to the system 10. The transparent cylindrical touch screen display 40 encircles the image chamber 66 and is thereby positioned between the eyes of users 18 seated within the plurality of seating positions 20A, 20B, 20C, 20D and the perceived image 36, 36A, 36B floating at the central location within the image chamber 66.

The transparent cylindrical touch screen display 40 is adapted to present visible displayed information only to the user 18 that is seated in a seating position 20A, 20B, 20C, 20D directly in front of a portion of the transparent cylindrical touch screen display 40. The nature of the transparent cylindrical touch screen display 40 is such that the displayed information is only displayed on a first side, the outward facing cylindrical surface, of the transparent cylindrical touch screen display 40. A second side, the inward facing cylindrical surface, of the transparent cylindrical touch screen display 40 does not display information, and thus, when viewed by the other users 18, allows the other users 18 to see through the transparent cylindrical touch screen display 40.

In one exemplary embodiment, the transparent cylindrical touch screen display 40 is an autostereoscopic display that is adapted to display stereoscopic, or three-dimensional images by adding binocular perception of three-dimensional depth without the use of special headgear, glasses, something that affects the viewer's vision, or anything for the viewer's eyes. Because headgear is not required, autostereoscopic displays are also referred to as "glasses-free 3D" or "glassesless 3D".

Figure 6:
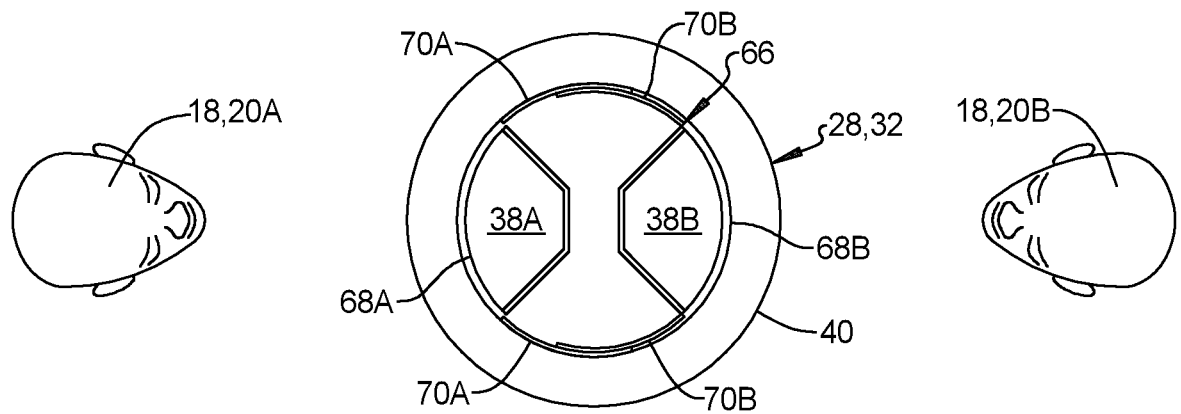
FIG. 6 is a schematic top view of the image chamber shown in FIG. 5.

Referring to FIG. 6, the transparent portions 68 of the image chamber 66 allow users 18 to see their associated reflector 38A, 38B, 38C, 38D. As shown, the image chamber 66 includes a first transparent portion 68A that is adapted to allow the first image 36A reflected by the first reflector 38A to pass from the image chamber 66 outward toward the user 18 seated within the first seating position 20A, as indicated by arrows 74 in FIG. 5. Further, the image chamber 66 includes a second transparent portion 68B that is adapted to allow the second image 36B reflected by the second reflector 38B to pass from the image chamber 66 outward toward the user 18 seated within the second seating position 20B, as indicated by arrows 80 in FIG. 5.

The image chamber 66 further includes solid portions 70 that are adapted to prevent light from entering the image chamber 66 behind the first and second reflectors 38A, 38B. The image chamber 66 functions much like a Pepper's Ghost Chamber, wherein the image of an object is perceived by a viewer within a reflective surface adjacent the actual image. As discussed above, in the present disclosure, the image presented by a display which is not within view of a passenger 18, is reflected by a reflector 38A, 38B, 38C, 38D to the user 18 such that the user 18 "sees" the image 36 within the image chamber 66 and perceives the image 36 to be floating behind the reflective surface of the reflector 38A, 38B, 38C, 38D. If the image chamber 66 behind the reflectors 38A, 38B, 38C, 38D is exposed to ambient light, the image 36 will not be viewable by the users 18. Thus, the solid portions 70 of the image chamber 66 are adapted to prevent light from entering the image chamber 66 behind the first and second reflectors 38A, 38B. Referring to FIG. 6, the image chamber 66 includes solid overlapping panels 70A, 70B that are adapted to prevent light from entering the image chamber 66 behind the first and second reflectors 38A, 38B.

Figure 7:
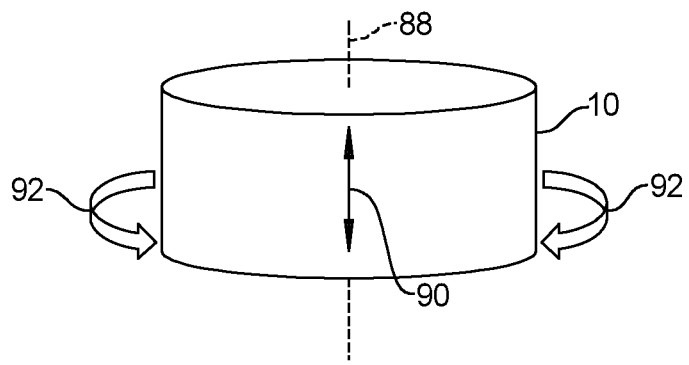
FIG. 7 is a schematic side view of the image chamber shown in FIG. 5 illustrating how the reflectors and displays of the image chamber move up and down and rotate.

Referring to FIG. 7, in an exemplary embodiment, the user display system 28, 32 is selectively moveable vertically up and down along a vertical central axis 88, as indicated by arrow 90. Further, each display and the associated reflectors 38A, 38B, 38C, 38D are unitarily and selectively rotatable about the vertical central axis 88, as shown by arrows 92. This allows the system 10 to adjust to varying locations of the passengers 18 within the vehicle 14.

Figure 8:
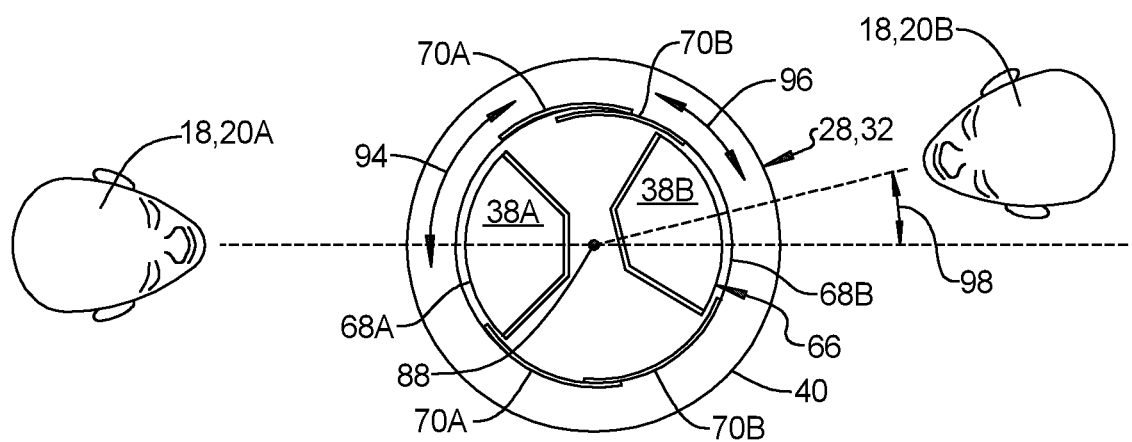
FIG. 8 is a schematic top view of the image chamber shown in FIG. 6, wherein a user at the second seating position has moves in and response, the second reflector and second display have rotated and angular distance to maintain alignment with the user at the second seating position.

Referring to FIG. 8, the first reflector 38A and the first display 34A are rotatable about the vertical central axis 88, as indicated by arrow 94. The second reflector 38B and the second display 34B are rotatable about the vertical central axis 88, as indicated by arrow 96. As shown in FIG. 5, the users 18 are seated within the first and second seating positions 20A, 20B directly across from one another, and the first reflector 38A and first display 34A are positioned 180 degrees from the second reflector 38B and second display 34B. As shown in FIG. 8, the position of the head of the user 18 within the second seating position 20B has moved, and the second reflector 38B and the second display 34B have been rotated an angular distance 98 to ensure the user 18 within the second seating position 20B perceives the image 36B from the second display 34B and the second reflector 38B.

In an exemplary embodiment, the first solid panels 70A positioned adjacent the first reflector 38A on either side are adapted to move unitarily with the first reflector 38A and the first display 34A as the first reflector 38A and the first display 34A rotate about the vertical central axis 88. The second solid panels 70B positioned adjacent the second reflector 38B on either side are adapted to move unitarily with the second reflector 38B and the second display 34B as the second reflector 38B and the second display 34B rotate about the vertical central axis 88. The first solid panels 70A overlap the second solid panels 70B to allow relative movement of the first solid panels 70A relative to the second solid panels 70B and to ensure that ambient light is blocked from entering the image chamber 66 behind the first and second reflectors 38A, 38B at all times.

In an exemplary embodiment, each of the displays 34, 34A, 34B and associated reflectors 38A, 38B, 38C, 38D are in communication with the occupant monitoring cameras 22A, 22B, 22C, 22D, wherein an orientation of each display 34, 34A, 34B and associated reflector 38A, 38B, 38C, 38D changes automatically in response to movement of the head and eyes of a user 18 detected by the occupant monitoring cameras 22A, 22B, 22C, 22D.

In an exemplary embodiment, the user display system 28, 32 receives data from the first occupant monitoring camera 22A related to the position of the head and eyes of the user seated within the first seating position 20A. The first display 34A and first reflector 38A are adapted to rotate in response to movement of the head and eyes of the user 18 based on data received from the first occupant monitoring camera 22A. The user display system 28, 32 further receives data from the second occupant monitoring camera 22B related to the position of the head and eyes of the user seated within the second seating position 20B. The second display 34B and second reflector 38B are adapted to rotate in response to movement of the head and eyes of the user 18 based on data received from the second occupant monitoring camera 22B. In addition to rotation of the first display 34A and first reflector 38A and the second display 34B and second reflector 38B, the user display system 28, 32 is adapted to move up and down along the vertical central axis 88, as shown in FIG. 7, in response to movement of the head and eyes of the users 18 within the first and second seating positions 20A, 20B.

Further details about the user display system shown in FIGS. 5-8 are disclosed within U.S. patent application Ser. No. 18/153,767, filed on Jan. 12, 2023 and entitled "ADAPTIVE INTERACTIVE CAMPFIRE DISPLAY", which is hereby incorporated by reference, in its' entirety, into the present disclosure.

In another exemplary embodiment, the system 10 includes audio devices, such as at least one microphone 24 to allow a user 18 to provide audible input to the system 10. The system 10 may include a microphone 24 adapted to receive audible input from any user 18 within the vehicle 14 and/or a microphone 24 that is specifically associated with one of the first, second, third and fourth seating positions 20A, 20B, 20C, 20D and adapted to pick up audible input only from the user 18 seated within the associated one of the first, second, third and fourth seating positions 20A, 20B, 20C, 20D.

In an exemplary embodiment, the user display system 28 is adapted to accept input from a user 18 based solely on contact between the user 18 and the user display system 28. For example, when a user 18 reaches out to touch a finger-tip to the touch screen display 40, the touch screen display 40 takes the input based solely on the point of contact between the tip of the finger of the passenger 18 and the transparent touch screen display 40.

In another exemplary embodiment, the system 10 is adapted to accept input from a user 18 based on contact between the user 18 and the touch screen display 40 and based on the location of a point of contact between the user 18 and the touch screen display 40 relative to the perceived image 36. For example, the occupant monitoring cameras 22A, 22B, 22C, 22D track the movement and position of the user's 18 eyes and head. The touch screen display 40 displays information that is perceived by the user 18 relative to the floating image 36, as discussed above. When the user 18 touches the touch screen display 40, the user 18 perceives that they are touching the floating image 36. The user display system 10 uses parallax compensation to correlate the actual point of contact between the finger-tip of the user 18 on the touch screen display 40 to the location on the floating image 36 that the user 18 perceives they are touching.

The user display system 28 may display, on the touch screen display 40, multiple different blocks of annotated information relative to a floating image 36. As the user's 18 head and eyes move, the user's head and eyes will be positioned at a different distance and angle relative to the touch screen display 40, thus changing the perceived location of displayed information relative to the image 36. By using parallax compensation techniques, such as disclosed in U.S. Pat. No. 10,318,043 to Seder, et al., hereby incorporated by reference herein, the user display system 28 ensures that when the user 18 touches the touch screen display 40, the user display system 28 correctly identifies the intended piece of annotated information that the user 18 is selecting.

In another exemplary embodiment, the user display system 28 is adapted to accept input from a user 18 based on gestures made by the user 18 where the user 18 does not touch the touch screen display 40. For example, when the user 18 moves a hand, or points to an object that is displayed on the touch screen display 40 or to an object within the vehicle compartment or outside of the vehicle 14.

Referring again to FIG. 5, using the embodiment of the user display system 28, 32 shown therein, in an exemplary embodiment, the user display system 28 includes a first gesture sensor 110 adapted to monitor position and movement of arms, hands and fingers 114 of the user 18 seated within the first seating position 20A and to gather data related to gestures made by the user 18. The first gesture sensor 110 is incorporated into or with the first occupant monitoring camera 22A and may include a separate camera and/or motion sensors adapted to detect the position and movement of the user 18 seated within the first seating position's 20A arms, hands and fingers. Further, the user display system 28 includes a second gesture sensor 112 adapted to monitor position and movement of arms, hands and fingers of the user 18 seated within the second seating position 20B and to gather data related to gestures made by the user 18. The second gesture sensor 112 is incorporated into or with the second occupant monitoring camera 22B and may include a separate camera and/or motion sensors adapted to detect the position and movement of the arms, hands and fingers of the user 18 seated within the second seating position 20B.

The vehicle display server uses data collected by the first and second gesture sensors 110, 112 to identify gestures made by the users 14A, 14B within the vehicle, using computer vision and computer learning algorithms and parallax compensation techniques to interpret such gestures and identify input data.

In an exemplary embodiment, the vehicle display server 12 is adapted to identify, using the plurality of sensors 16 positioned within the vehicle 14, computer vision algorithms and stored data, an identity of a user 18 seated at a one of the plurality of seating positions 20A, 20B, 20C, 20D within the vehicle 14. Once the vehicle display server 12 identifies the user 18, the vehicle display server 12 selects user specific content to be displayed for the user 18 on the user display system 28. User specific content may include applications or accounts for which the user 18 has previously registered and accesses with the system 10 regularly. For example, a user 18 regularly, when using the system 10 within the vehicle 14, watches a streamed news service. Thus, when the vehicle display server 12 identifies the user 18, the vehicle display server 12 will select the streamed news service as user specific content that may be displayed for the user 18. User specific content may also include contextual based content, such as, for example, if local weather services are calling for very bad storms in the near future, the vehicle display server 12 may tag weather information services as user specific content that will be displayed for the user 18 to inform the user of the upcoming bad weather. User specific content may also be based on probabilistic calculations with a machine learning algorithm of what content the user 18 may want based on stored data taking into consideration time of day/night, destination, number of passengers in the vehicle with the user 18, identity of the other passengers within the vehicle 14, etc.

Once the vehicle display server 12 has selected, using the identity of the user 18, user specific content to be displayed for the user 18, the vehicle display server 12 automatically displays the user specific content on the user display system 28 for the seating position 20A, 20B, 20C, 20D wherein the user 18 sits. Automatic display of user specific content will be dependent upon the system 10 identifying the user 18, and the user 18 being registered with the system 10 and agreeing to terms and conditions associated with use of the system 10. If the system 10 identifies the user 18 as a registered user of the system 10, the system will automatically initiate display of user specific content selected for that user 18. The vehicle display server 12 may display multiple options of various items that are included in the user specific content, or may, based on probabilistic calculations automatically prioritize different items of user specific content and display the highest ranked item. For example, a user 18 may be watching a movie on the user display system 28 within the vehicle 14, when the vehicle 14 arrives at a destination, wherein the user 18 terminates display of the movie and exits the vehicle 14. When the user 18 returns to the vehicle 14, the vehicle display server 12 will prioritize the movie and automatically resume displaying the movie for the user 18 on the user display system 28 directed to the seating position 20A, 20B, 20C, 20D where the user 18 sits.

In an exemplary embodiment, when a user 18 seated at the first seating position 20A within the vehicle 14 moves to the second seating position 20B within the vehicle 14, the vehicle display server 12 is adapted to detect, with the plurality of sensors 16 positioned within the vehicle 14, such as the first occupant monitoring camera 22A, when the user 18 leaves the first seating position 20A within the vehicle 14. When the vehicle display server 12 detects the user 18 has left the first seating position 20A, the vehicle display server 12 automatically pauses the user specific content that is currently being displayed on the user display system 28 for the first seating position 20A. When the vehicle display server 12 detects, with the plurality of sensors 16 positioned within the vehicle 14, such as the second occupant monitoring camera 22B, when the user 18 sits at the second seating position 20B within the vehicle 14, the vehicle display server 12 automatically resumes displaying the user specific content on the user display system 28, directed to the second seating position 20B.

Thus, for example, when a user 18 is watching content, specific user content for that user 18, on the user display system 28 at a particular seating position, and additional passengers embark within the vehicle 14 necessitating shuffling of the user 18 and the other passengers within the vehicle 14, the vehicle display server 12 automatically detects when the user 18 moves, and automatically resumes the user's content when the user 18 picks a new seating position within the vehicle 14.

In another exemplary embodiment, the vehicle display server 12 is adapted to identify, using the plurality of sensors 16 positioned within the vehicle 14, when a user 18 that is viewing the user display system 28 looks away from the user display system 28, pause user specific content that is being displayed on the user display system 28, identify, using the plurality of sensors 16 positioned within the vehicle 14, when the user 18 returns to looking at the user display system 28, and resume displaying the user specific content on the user display system 28. Thus, for example, when a user 18, seated within the first seating position 20A within the vehicle 14 is watching user specific content on the user display system 28, and looks away from the user display system 28 to observe a situation outside of the vehicle 14, the vehicle display server 12 automatically detects, using the plurality of sensors 16 positioned within the vehicle 14, such as the first occupant monitoring system 22A, that the user is looking away. The vehicle display server 12 then pauses the user specific content that is being displayed on the user display system 28, such as, for example, pausing a movie that the user 18 is watching, until the vehicle display server 12 detects, using the first occupant monitoring camera 22A, that the user 18 has returned to looking at the user display system 28, at which time the vehicle display server 12 resumes the movie.

Referring again to FIG. 1, the system 10 further includes a cloud-based host server 120 in communication, via a wireless communication network 122, with the vehicle display server 12 within the vehicle 14. The cloud-based host server 120 is also in communication with at least one remote vehicle 124, the remote vehicle 124 having a vehicle display server 12' in communication with the cloud-based host server 120, a plurality of sensors 16', haptic feedback devices 26A', 26B', 26C', 26D', a plurality of seating positions 20A', 20B', 20C', 20D' and a user display system 28' substantially identical to the corresponding features of the vehicle 14.

In an exemplary embodiment, when a user 18 seated within the vehicle 14 exits the vehicle 14 and moves to a one of the at least one remote vehicle 124, the vehicle display server 12 within the vehicle 14 is adapted to detect, with the plurality of sensors 16 positioned within the vehicle 14, such as the occupant monitoring cameras 22A, 22B, 22C, 22D, when the user 18 leaves the vehicle 14, and pause user specific content that is currently being displayed on the user display system 28 within the vehicle 14. The vehicle display server 12' within the one of the at least one remote vehicle 124 is adapted to detect, with the plurality of sensors 16' positioned within the one of the at least one remote vehicle 124, when the user 18 enters the one of the at least one remote vehicle 124. The vehicle display server 12' uses the plurality of sensors 16' positioned within the one of the at least one remote vehicle 124, computer vision algorithms and stored data, to identify the user 18. The vehicle display server 12' within the one of the at least one remote vehicle 124 then obtains, via communication with the vehicle display server 12 within the vehicle 14, through the host server 120, information related to the user specific content that the user 18 was viewing in the vehicle 14 prior to exiting the vehicle 14. At this time, the vehicle display server 12' within the one of the at least one remote vehicle 124 automatically resumes displaying the user specific content on the user display system 28' within the one of the at least one remote vehicle 124 into which the user 18 entered, at the seating position 20A', 20B', 20C', 20D' within the one of the at least one remote vehicle 124 where the user 18 sits.

This allows a user 18 to continue interacting with user specific content throughout a journey by having user specific content automatically follow the user 18. For example, a user 18 is playing an interactive game with other remotely located players. The user 18 begins playing the game while riding in their personal vehicle 14 on the way to a car pool lot, wherein the user 18 exits their personal vehicle 14 and enters an autonomous carpool vehicle 124. The system 10 will automatically pause the display on the user display system 28 within the personal vehicle 14, and pause gameplay when the user 18 exits their personal vehicle 14. Once the user 18 enters the autonomous car pool vehicle 124 and selects a seating position 20A', 20B', 20C', 20D' within the autonomous car pool vehicle 124, the vehicle display server 12' within the autonomous car pool vehicle 124 will resume gameplay with the other players and display gameplay on the user display system 28' within the autonomous car pool vehicle 124.

The host server is adapted to coordinate the vehicle display server 12 and the user display system 28 positioned within the vehicle 14 and being viewed by a first user 18 with a vehicle display server 12' and user display system 28' positioned within a one of the at least one remote vehicle 124 and being viewed by a second user 18' and facilitate communication and interaction between the first user 18 and the second user 18'. In this way, the host server 120 provides a coordinated interaction between the first user 18 and the second user 18' as they watch the same movie, play an interactive game together, or participate in multiple participant audio and/or video conversations.

In an exemplary embodiment, the host server is in communication with a personal device 126 of a user 18. For example, a user 18 that is registered to use the system 10 may have an app that allows the personal device 126, such as a phone or tablet, to be linked to the system 10. Thus, when the user 18 is viewing user specific content on the user display system 28 within the vehicle 14 and the user 18 exits the vehicle 14, the host server 120 is adapted to receive data from the plurality of sensors 16 positioned within the vehicle 14, via communication with the vehicle display server 12 within the vehicle 14, when the user 18 leaves the vehicle 14, and automatically pause the user specific content that is currently being displayed on the user display system 28 within the vehicle 14. If the personal device 126 is linked with the system 10, the host server 120 will automatically resume displaying the user specific content on the personal device 126 of the user 18 after the user 18 leaves the vehicle 14. The host server 120 will also provide the option for the user 18 to selectively terminate the user specific content or pause the user specific content without resuming on the personal device 126. Similarly, when the user 18 is viewing user specific content on the personal device 126 and the user 18 enters the vehicle 14, the host server 120 is adapted to detect, with data received from the plurality of sensors 16 positioned within the vehicle 14, via communication with the vehicle display server 12 within the vehicle 14, when the user 18 enters the vehicle 14, and automatically prompt the user 18 with the option to selectively pause the user specific content that is currently being displayed on the personal device 126, and resume displaying the user specific content on the user display system 28 within the vehicle 14.

In an exemplary embodiment, the plurality of sensors 16 within the vehicle, specifically the first, second, third and fourth occupant monitoring cameras 22A, 22B, 22C, 22D, are adapted to monitor the position of the head and eyes of each one of the users 18 seated in the plurality of seating positions 20A, 20B, 20C, 20D within the vehicle 14. For each seating position 20A, 20B, 200, 20D, the vehicle display server 12 is adapted to display information at a specific location on the transparent touch screen display 40 of the user display system 28 based on a position of the head and eyes of the user 18. In another exemplary embodiment, for each of the plurality of seating positions 20A, 20B, 20C, 20D within the vehicle 14, the vehicle display server 12 is adapted to display information at a specific location on the transparent touch screen display 40 of the user display system 28 based on the position of the head and eyes of the users 18 relative to the perceived image 36 floating at the central location within the vehicle 14, such that, for each of the plurality of seating positions 20A, 20B, 20C, 20D, information displayed on the transparent touch screen display 40 of the user display system 28 is properly positioned relative to the perceived image 36, as viewed by the user 18 seating within the seating position 20A, 20B, 20C, 20D.

Figure 9:
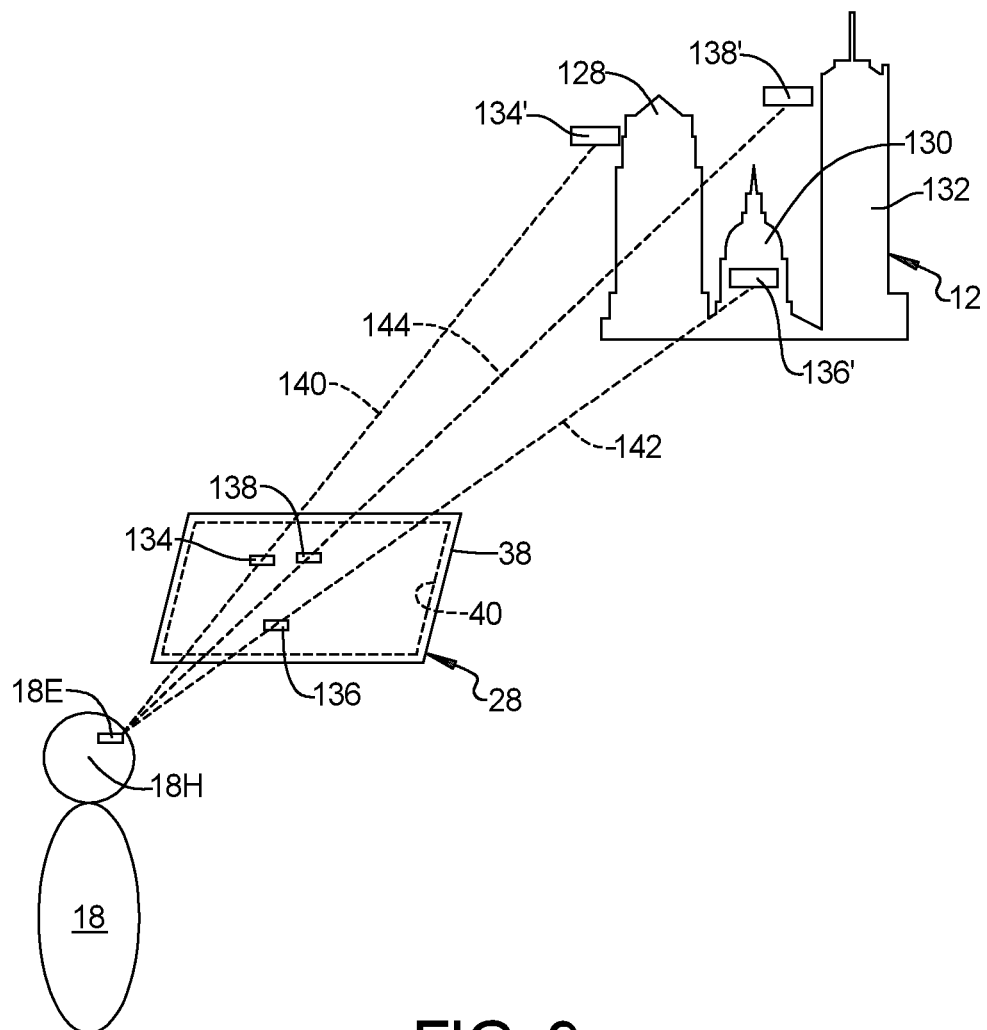
FIG. 9 is a schematic view illustrating a user viewing an image and annotation information through an associated beam splitter and transparent touch screen display.

Referring to FIG. 9, in a schematic view of a user 18 viewing a user display system 28 including an associated reflector 38, a transparent touch screen display 40, and a floating image 36, the user 18 perceives the floating image 36 at a distance in front of the reflector 38. As shown, the user display system 28 includes a transparent touch screen display 40 incorporated into the reflector 38 for each individual user 18. These principles apply similarly to a user display system 28 incorporating individual reflectors and a transparent cylindrical touch screen display 40 as well.

The transparent touch screen display 40 displays information related to the floating image 36 at a proper location on the transparent touch screen display 40 the user 18 sees the information at a proper location relative to the floating image 36. As shown in FIG. 9, the floating image 36 is of a skyline, and more specifically, of three buildings, a first building 128, a second building 130, and a third building 132. The transparent touch screen display (or the transparent cylindrical touch screen display) 40 displays first building information 134, second building information 136 and third building information 138.

The first building information 134 appears in a text box and may contain information about the first building 128 as well as the option of allowing the user 18 to touch the first building information 134 text box to acquire additional information about the first building 128. For example, the first building information 134 text box may contain the name of the first building 128 and the street address. The passenger 18 may opt to touch the first building information 134 text box, wherein additional information will appear on the transparent touch screen display 40, such as the date the first building 128 was built, what type of building (office, church, arena, etc.), or statistics such as height, capacity, etc. The second building information 136 and the third building information 138 also appear in text boxes that contain similar information and the option for the user 18 to touch the second or third building information 136, 138 text boxes to receive additional information about the second and third buildings 130, 132.

The occupant monitoring cameras 22A, 22B, 22C, 22D track the position of the user's 18 head 18H and eyes 18E and positions the first, second and third building information 134, 136, 138 text boxes at a location on the transparent touch screen display 40, such that when the user looks at the floating image 36 through the reflector/beam splitter 38 and the transparent touch screen display (transparent cylindrical touch screen display) 40, the user 18 sees the first, second and third building information 134, 136, 138 text boxes at the proper locations relative to the floating image 36. For example, the transparent touch screen display (transparent cylindrical touch screen display) 40 positions the first building information 134 in the user's line of sight, as indicated by dashed line 140, such that the first building information 134 is perceived by the user 18 at a location immediately adjacent the first building 128, as indicated at 134'. Correspondingly, the transparent touch screen display (transparent cylindrical touch screen display) 40 positions the second building information 136 in the user's line of sight, as indicated by dashed line 142, and the third building information 138 in the user's line of sight, as indicated by dashed line 144, such that the second and third building information 136, 138 is perceived by the user 18 at a location superimposed on the building, in the case of the second building 130, as indicated at 136', and at a location immediately adjacent the building, in the case of the third building 132, as indicated at 138'.

The occupant monitoring cameras 22A, 22B, 22C, 22D continuously track movement of the head 18H and eyes 18E of the user 18 and adjusts the position that the first, second and third building information 1234, 136, 138 are displayed on the transparent touch screen display (transparent cylindrical touch screen display) 40 to ensure that the user 18 always perceives the first, second and third building information 134, 136, 138 at the proper locations 134', 136', 138' relative to the floating image 36.

In an exemplary embodiment, when using the identity of the user seated within the vehicle 14 to select user specific content to be displayed for the user, the vehicle display server 12 is adapted to access stored historical data of past content viewed by the user 18, such data being stored within the vehicle display server 12 within the vehicle 14 and/or within a cloud-based database 146 within and/or in communication with the host server 120. The vehicle display server 12 may further prompt the user 18 to selectively resume viewing content that the user 18 was previously viewing on a different user display system, and/or prompt a user 18 to selectively view content that is already being viewed by other users within the same vehicle 14.

Figure 10:
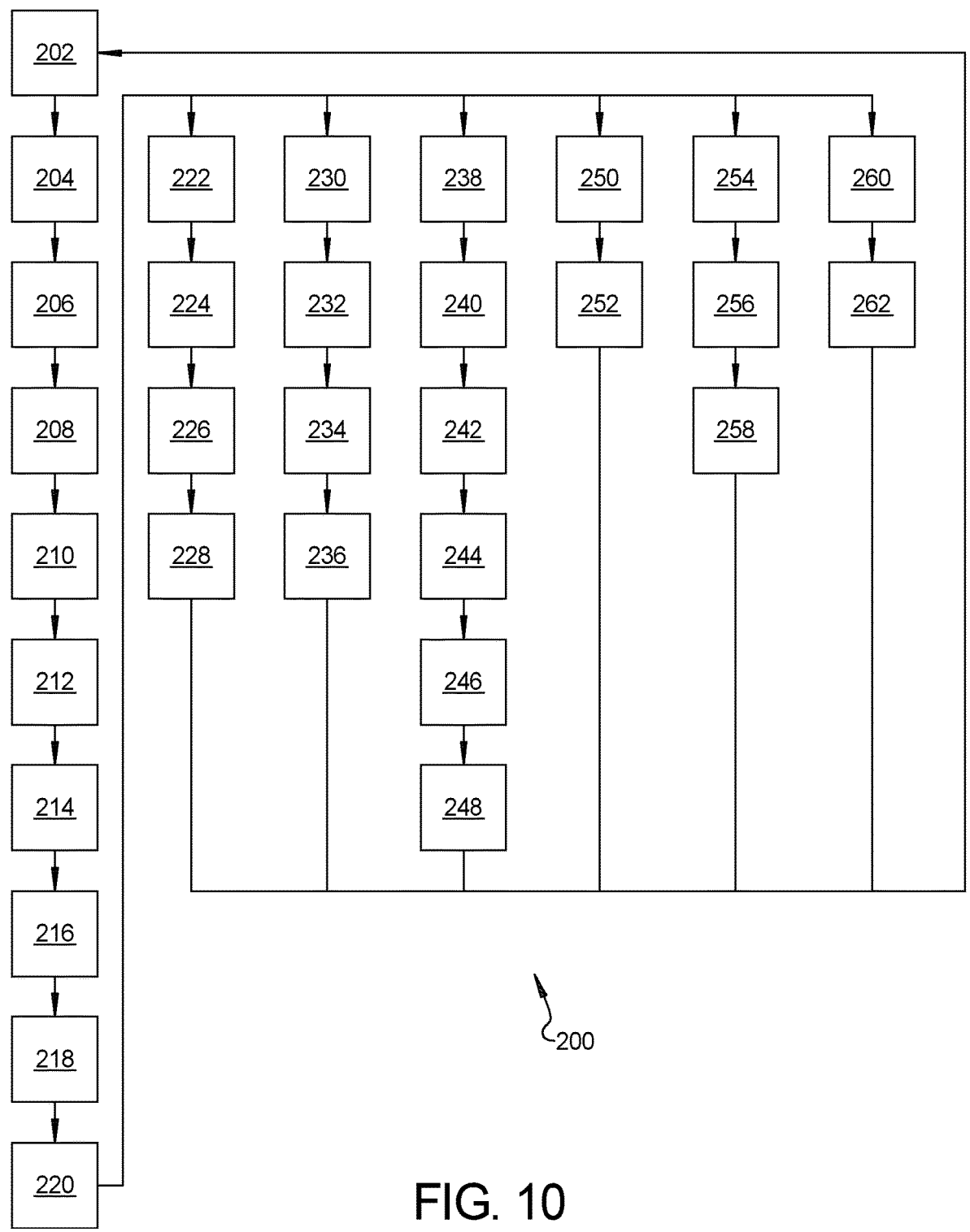
FIG. 10 is a flow chart illustrating a method according to an exemplary embodiment of the present disclosure.

Referring to FIG. 10, a method 200 for using a system for enabling vehicle display and interaction, includes, with a vehicle display server 12 positioned within a vehicle 14 and in communication with a plurality of sensors 16 positioned within the vehicle 14, beginning at block 202, tracking head and eye position and movement of users 18 seated within a plurality of seating positions 20A, 20B, 20C, 20D within the vehicle 14, moving to block 204, detecting locations of users 18 within the vehicle 14 and when users 18 change seating positions 20A, 20B, 20C, 20D within the vehicle 14, moving to block 206, detecting when a user 18 enters and exits the vehicle 14, moving to block 208, detecting and interpreting facial and gesture inputs from users 18 within the vehicle 14, moving to block 210, capturing images of users 18 within the vehicle 14, and, moving to block 212, receiving audio inputs from users within the vehicle.

Moving from block 212 to block 214, the method 200 further includes providing, with haptic feedback devices 26A, 26B, 26C, 26D positioned within the vehicle 14 and in communication with the vehicle display server 12, haptic feedback to users 18 seated within the vehicle 14, moving to block 216, identifying, using the plurality of sensors 16 positioned within the vehicle 14, computer vision algorithms and stored data, an identity of a user 18 seated at one of the plurality of seating positions 20A, 20B, 20C, 20D within the vehicle 14, moving to block 218, selecting, using the identity of the user 18 seated at the one of the plurality of seating positions 20A, 20B, 20C, 20D within the vehicle 14, user specific content to be displayed on a user display system 28 for the user 18 seated at one of the plurality of seating positions 20A, 20B, 20C, 20D, and, moving to block 220, automatically displaying, with the user display system 28 positioned within the vehicle 14 for viewing and interaction by a user 18 seated at one of the plurality of seating positions 20A, 20B, 20C, 20D, the user specific content.

In an exemplary embodiment, the method 200 further includes, when a user 18 seated at the first position 20A within the vehicle 14 moves to the second position 20B within the vehicle 14, moving to block 222, detecting, with the vehicle display server 12 and the plurality of sensors 16 positioned within the vehicle 14, when the user 18 leaves the first seating position 20A within the vehicle 14, moving to block 224, pausing, with the vehicle display server 12, user specific content that is currently being displayed on the user display system 28 for the user 18 at the first seating position 20A, moving to block 226, detecting, with the vehicle display server 12 and the plurality of sensors 16 positioned within the vehicle 14, when the user 18 sits at the second seating position 20A within the vehicle 14, and, moving to block 228, resuming, with the vehicle display server 12, display of the user specific content on the user display system 28 for the user 18 at the second seating position 20B.

In another exemplary embodiment, the displaying of the user specific content on the user display system 28 at block 220 further includes, one of displaying user specific content on a user display system 28 comprising a plurality of individual display screens 30A, 30B, 30C, 30D adapted to display information and receive input from a user 18, one individual display screen 30A, 30B, 30C, 30D associated with each of the plurality of seating positions 20A, 20B, 20C, 20D within the vehicle 14, or, displaying user specific content on a user display system 28 comprising a single display system 32 including at least one display 34 for projecting an image 36, a plurality of reflectors 38A, 38B, 38C, 38D, each reflector 38A, 38B, 38C, 38D associated with a one of the plurality of seating positions 20A, 20B, 20C, 20D within the vehicle 14 and adapted to reflect a projected image 36 to the associated one of the plurality of seating positions 20A, 20B, 20C, 20D, such that a user 18 seated at the associated one of the plurality of seating positions 20A, 20B, 20C, 20D within the vehicle 14 perceives the image 36 floating at a central location within the vehicle 14, and a transparent cylindrical touch screen display 40 positioned between the plurality of seating positions 20A, 20B, 20C, 20D within the vehicle 14 and the plurality of reflectors 38A, 38B, 38C, 38D and adapted to display user specific content for users 18 at each of the plurality of seating positions 20A, 20B, 20C, 20D within the vehicle 14 and receive input from each of the users 18 at each of the plurality of seating positions 20A, 20B, 20C, 20D within the vehicle 14.

In another exemplary embodiment, the method 200 includes, with the vehicle display server 12, moving to block 230, identifying, with the plurality of sensors 16 positioned within the vehicle 14, when a user 18 that is viewing the user display systems 28 looks away from the user display system 28, moving to block 232, pausing user specific content that is being displayed on the user display system 28, moving to block 234, identifying, using the plurality of sensors 16 positioned within the vehicle 14, when the user 18 returns to looking at the user display system 28, and, moving to block 236, resuming display of the user specific content on the user display system 28.

In another exemplary embodiment, wherein the system 10 further includes a cloud-based host server 120 in communication, via a wireless communication network 122, with the vehicle display server 12 within the vehicle 14, the cloud-based host server 120 further in communication with at least one remote vehicle 124, the remote vehicle 124 having a vehicle display server 12' in communication with the cloud-based host server 120, a plurality of sensors 16', haptic feedback devices 26A', 26B', 26C', 26D', a plurality of seating positions 20A', 20B', 20C', 20D' and a user display system 28' substantially identical to the corresponding features of the vehicle 14, the method 200 further including, when a user 18 seated within the vehicle 14 exits the vehicle 14 and moves to a one of the at least one remote vehicle 124, moving to block 238, detecting, with the vehicle display server 12 and the plurality of sensors 16 positioned within the vehicle 14, when the user 18 leaves the vehicle 14, moving to block 240, pausing, with the vehicle display server 12 within the vehicle 14, user specific content that is currently being displayed on the user display system 28 within the vehicle 14, moving to block 242, detecting, with the vehicle display server 12' and the plurality of sensors 16' positioned within the one of the at least one remote vehicle 124, when the user 18 enters the one of the at least one remote vehicle 124, moving to block 244, identifying, using the vehicle display server 12' and the plurality of sensors 16' positioned within the one of the at least one remote vehicle 124, computer vision algorithms and stored data, an identity of the user 18, moving to block 246, obtaining, with the vehicle display server 12' within the one of the at least one remote vehicle 124, via communication with the host server 120, information related to the user specific content that the user 18 was viewing in the vehicle 14 prior to exiting the vehicle 14, and, moving to block 248, automatically resuming display of the user specific content on the user display system 28' within the one of the at least one remote vehicle 124 into which the user 18 entered.

In another exemplary embodiment, the method 200 further includes, moving to block 250, coordinating, with the host server 120, the vehicle display server 12 and the user display system 28 positioned within the vehicle 14 and being viewed by a first user 18 seated within the vehicle 14 with the vehicle display server 12' and user display system 28' positioned within a one of the at least one remote vehicle 124 and being viewed by a second user 18, and, moving to block 252, facilitating, with the host server 120, communication and interaction between the first user 18 within the vehicle 14 and the second user 18 within the remote vehicle 124.

In another exemplary embodiment, wherein the host server 120 is in communication with a personal device 126 of a user 18, the method 200 further includes, when the user 18 is viewing user specific content on the user display system 28 within the vehicle 14 and the user 18 exits the vehicle 14, moving to block 254, detecting, with the host server 120 and the plurality of sensors 16 positioned within the vehicle 14 via communication with the vehicle display server 12 within the vehicle 14, when the user 18 leaves the vehicle 14, moving to block 256, automatically pausing, with the host server 120, the user specific content that is currently being displayed on the user display system 28 within the vehicle 14, and, moving to block 258, automatically resuming, with the host server 120, displaying the user specific content on the personal device 126 of the user 18, and, when the user is viewing user specific content on the personal device 126 and the user 18 enters the vehicle 14, the method 200 further includes, moving to block 260, detecting, with the host server 120 and the plurality of sensors 16 positioned within the vehicle 14 via communication with the vehicle display server 12 within the vehicle 14, when the user 18 enters the vehicle 14, and, moving to block 262, automatically prompting, with the host server 120, the user 18 with the option to selectively pause the user specific content that is currently being displayed on the personal device 126, and resume displaying the user specific content on the user display system 28 within the vehicle 14.

A system and method of the present disclosure offers several advantages. These include providing a floating image that is perceived by the passengers at a centrally location position within the vehicle compartment. This provides a camp-fire like viewing atmosphere where the passengers can all view a common floating image, or each passenger can view a unique floating image. Further, a system in accordance with the present disclosure provides the ability to display annotations and information not embedded within the virtual image and to ensure such annotations and information are perceived by a passenger at a proper location relative to the virtual image and in a plane between the passenger and the floating image. The system enables interaction between multiple users that are located within the same vehicle or within different vehicles and provides automatic identification of a user and selection/display of content specific to that user and displayed specifically to a seating position within a vehicle where the user is sitting. The system further enables such selected user specific content to follow a user moving from one seating position to another within a vehicle or moving from one vehicle to a different vehicle.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for enabling vehicle display and interaction, comprising:
 a vehicle display server positioned within a vehicle and in communication with:
 a plurality of sensors positioned within the vehicle and adapted to:
 track head and eye position and movement of users seated within a plurality of seating positions within the vehicle;
 detect locations of users within the vehicle and when users change seating positions within the vehicle;
 detect when a user enters and exits the vehicle;
 detect and interpret facial and gesture inputs from users within the vehicle;
 capture images of users within the vehicle;
 receive audio inputs from users within the vehicle;
 haptic feedback devices positioned within the vehicle and adapted to provide haptic feedback to users seated within the vehicle; and
 a user display system positioned within the vehicle for viewing and interaction by users seated within the plurality of seating positions within the vehicle;
 the vehicle display server adapted to:
 identify, using the plurality of sensors positioned within the vehicle, computer vision algorithms and stored data, an identity of a user seated at a one of the plurality of seating positions within the vehicle;
 select, using the identity of the user seated at the one of the plurality of seating positions within the vehicle, user specific content to be displayed for the user on the user display system; and
 automatically display the user specific content on the user display system for viewing by the user seated within the one of the plurality of seating positions within the vehicle; and
 when a user seated at a first seating position within the vehicle moves to a second seating position within the vehicle, the vehicle display server is adapted to:
 detect, with the plurality of sensors positioned within the vehicle, when the user leaves the first seating position within the vehicle;
 pause user specific content that is currently being displayed on the user display system for the first seating position;
 detect, with the plurality of sensors positioned within the vehicle, when the user sits at the second seating position within the vehicle; and
 resume displaying the user specific content on the user display system for the second seating position.

2. The system of claim 1, wherein the plurality of sensors includes an occupant monitoring camera for each one of the plurality of seating positions.

3. The system of claim 2, wherein the user display system comprises one of: a plurality of individual display screens adapted to display information and receive input from a user, one individual display screen associated with each of the plurality of seating positions within the vehicle; or a single display system comprising: at least one display for projecting an image; a plurality of reflectors, each reflector associated with a one of the plurality of seating positions within the vehicle and adapted to reflect a projected image to the associated one of the plurality of seating positions, such that a user seated at the associated one of the plurality of seating positions within the vehicle perceives the image floating at a central location within the vehicle; and a transparent cylindrical touch screen display positioned between the plurality of seating positions within the vehicle and the plurality of reflectors and adapted to display user specific content for users at each of the plurality of seating positions within the vehicle and receive input from each of the users at each of the plurality of seating positions within the vehicle.

4. The system of claim 3 wherein, the vehicle display server is adapted to: identify, using the plurality of sensors positioned within the vehicle, when a user that is viewing the user display system looks away from the user display system; pause user specific content that is being displayed on the user display system; identify, using the plurality of sensors positioned within the vehicle, when the user returns to looking at the user display system; and resume displaying the user specific content on the user display system.

5. The system of claim 4, further including a cloud-based host server in communication, via a wireless communication network, with the vehicle display server within the vehicle, the cloud-based host server further in communication with at least one remote vehicle, the remote vehicle having a vehicle display server in communication with the cloud-based host server, a plurality of sensors, haptic feedback devices, a plurality of seating positions and a user display system substantially identical to the corresponding features of the vehicle.

6. The system of claim 5, wherein when a user seated within the vehicle exits the vehicle and moves to a one of the at least one remote vehicle, the vehicle display server within the vehicle is adapted to: detect, with the plurality of sensors positioned within the vehicle, when the user leaves the vehicle; and pause user specific content that is currently being displayed on the user display system within the vehicle; and the vehicle display server within the one of the at least one remote vehicle is adapted to: detect, with the plurality of sensors positioned within the one of the at least one remote vehicle, when the user enters the one of the at least one remote vehicle; identify, using the plurality of sensors positioned within the one of the at least one remote vehicle, computer vision algorithms and stored data, an identity of the user; obtain, via communication with the host server, information related to the user specific content that the user was viewing in the vehicle prior to exiting the vehicle; and automatically resume displaying the user specific content on the user display system within the one of the at least one remote vehicle into which the user entered.

7. The system of claim 6, wherein the host server is adapted to coordinate the vehicle display server and the user display system positioned within the vehicle and being viewed by a first user with a vehicle display server and user display system positioned within a one of the at least one remote vehicle and being viewed by a second user and facilitate communication and interaction between the first user and the second user.

8. The system of claim 7, wherein the host server is in communication with a personal device of a user, and further wherein: when the user is viewing user specific content on the user display system within the vehicle and the user exits the vehicle, the host server is adapted to: detect, with the plurality of sensors positioned within the vehicle via communication with the vehicle display server within the vehicle, when the user leaves the vehicle; automatically pause the user specific content that is currently being displayed on the user display system within the vehicle; and automatically resume displaying the user specific content on the personal device of the user; and when the user is viewing user specific content on the personal device and the user enters the vehicle, the host server is adapted to: detect, with the plurality of sensors positioned within the vehicle via communication with the vehicle display server within the vehicle, when the user enters the vehicle; automatically prompt the user with the option to selectively: pause the user specific content that is currently being displayed on the personal device; and resume displaying the user specific content on the user display system within the vehicle.

9. The system of claim 3, wherein for the user display system comprising a single display system, the plurality of reflectors comprises a plurality of transparent beam splitters, one transparent beam splitter individually associated with each one of the plurality of seating positions within the vehicle, each beam splitter adapted to receive an image from the at least one display and to reflect the image to the associated one of the plurality of seating positions, wherein, a user seated at the associated one of the plurality of seating positions within the vehicle perceives the image floating at a central location within the vehicle.

10. The system of claim 3, wherein for the user display system comprising a single display system, further including: an image chamber including: at least one display adapted to project an image; a reflector individually associated with each one of the plurality of seating positions within the vehicle and adapted to reflect the image to the associated one of the plurality of seating positions within the vehicle, such that a user seated at the associated one of the plurality of seating positions within the vehicle perceives the image floating at a central location within the vehicle; transparent portions adapted to allow the image reflected by the reflector to pass from the image chamber outward toward a user seated at the associated one of the plurality of seating positions; and solid portions adapted to prevent light from entering the image chamber behind the reflector; and the transparent cylindrical touch screen display positioned between the reflectors of the image chamber and the plurality of seating positions within the vehicle, and adapted to display information to users seated at the plurality of seating locations within the vehicle within an image plane positioned in front of the perceived image floating at the central location within the vehicle.

11. The system of claim 3, wherein the user display system is adapted to: monitor, using the plurality of sensors within the vehicle, a position of a head and eyes of a user; display information at a specific location on the transparent cylindrical touch screen display based on a position of the head and eyes of the user; and display information at a specific location on the transparent cylindrical touch screen display based on the position of the head and eyes of the user relative to the perceived image, such that information displayed on the transparent cylindrical touch screen display is properly positioned relative to the perceived image.

12. The system of claim 1, wherein, when using the identity of the user seated at the position within the vehicle to select user specific content to be displayed for the user, the vehicle display server is adapted to: access stored historical data of past content viewed by the user; select user specific content based on contextual information; prompt the user to selectively resume viewing content that the user was previously viewing on a different user display system; and prompt a user to selectively view content that is already being viewed by other users within the same vehicle.

13. A method for using a system for enabling vehicle display and interaction, comprising:

with a vehicle display server positioned within a vehicle and in communication with a plurality of sensors positioned within the vehicle:

tracking head and eye position and movement of users seated within a plurality of seating positions within the vehicle;

detecting locations of users within the vehicle and when users change seating positions within the vehicle;

detecting when a user enters and exits the vehicle;
detecting and interpreting facial and gesture inputs from users within the vehicle;
capturing images of users within the vehicle; and
receiving audio inputs from users within the vehicle;
providing, with haptic feedback devices positioned within the vehicle and in communication with the vehicle display server, haptic feedback to users seated within the vehicle; and
identifying, using the plurality of sensors positioned within the vehicle, computer vision algorithms and stored data, an identity of a user seated at one of the plurality of seating positions within the vehicle;
selecting, using the identity of the user seated at the one of the plurality of seating positions within the vehicle, user specific content to be displayed on the user display system for the user seated at the one of the plurality of seating positions; and
automatically displaying, with the user display system positioned within the vehicle for viewing and interaction by a user seated at the one of the plurality of seating positions, the user specific content; and
when a user seated at the first position within the vehicle moves to the second position within the vehicle, the method further including:
detecting, with the vehicle display server and the plurality of sensors positioned within the vehicle, when the user leaves the first seating position within the vehicle;
pausing, with the vehicle display server, user specific content that is currently being displayed on the first user display system for the user at the first seating position;
detecting, with the vehicle display server and the plurality of sensors positioned within the vehicle, when the user sits at the second seating position within the vehicle; and
resuming, with the vehicle display server, display of the user specific content on the user display system for the user at the second seating position.

14. The method of claim 13, wherein:
the detecting, with the vehicle display server and the plurality of sensors positioned within the vehicle, when the user leaves the first seating position within the vehicle further includes detecting, with the vehicle display server and a first occupant monitoring camera, when the user leaves the first seating position within the vehicle; and
the detecting, with the vehicle display server and the plurality of sensors positioned within the vehicle, when the user sits at the second seating position within the vehicle further includes detecting, with the vehicle display server and a second occupant monitoring camera, when the user sits at the second seating position within the vehicle.

15. The method of claim 14, wherein the displaying of the user specific content on the user display system further includes one of: displaying user specific content on a user display system comprising a plurality of individual display screens adapted to display information and receive input from a user, one individual display screen associated with each of the plurality of seating positions within the vehicle; or displaying user specific content on a user display system comprising a single display system including: at least one display for projecting an image; a plurality of reflectors, each reflector associated with a one of the plurality of seating positions within the vehicle and adapted to reflect a projected image to the associated one of the plurality of seating positions, such that a user seated at the associated one of the plurality of seating positions within the vehicle perceives the image floating at a central location within the vehicle; and a transparent cylindrical touch screen display positioned between the plurality of seating positions within the vehicle and the plurality of reflectors and adapted to display user specific content for users at each of the plurality of seating positions within the vehicle and receive input from each of the users at each of the plurality of seating positions within the vehicle.

16. The method of claim 15 further including, with the vehicle display server: identifying, with the plurality of sensors positioned within the vehicle, when a user that is viewing the user display systems looks away from the user display system; pausing user specific content that is being displayed on the user display system; identifying, using the plurality of sensors positioned within the vehicle, when the user returns to looking at the user display system; and resuming display of the user specific content on the user display system.

17. The method of claim 16, wherein the system further includes a cloud-based host server in communication, via a wireless communication network, with the vehicle display server within the vehicle, the cloud-based host server further in communication with at least one remote vehicle, the remote vehicle having a vehicle display server in communication with the cloud-based host server, a plurality of sensors, haptic feedback devices, a plurality of seating positions and a user display system substantially identical to the corresponding features of the vehicle, the method further including, when a user seated within the vehicle exits the vehicle and moves to a one of the at least one remote vehicle: detecting, with the vehicle display server and the plurality of sensors positioned within the vehicle, when the user leaves the vehicle; pausing, with the vehicle display server within the vehicle, user specific content that is currently being displayed on the user display system within the vehicle;
detecting, with the vehicle display server and the plurality of sensors positioned within the one of the at least one remote vehicle, when the user enters the one of the at least one remote vehicle;
and identifying, using the vehicle display server and the plurality of sensors positioned within the one of the at least one remote vehicle, computer vision algorithms and stored data, an identity of the user; obtaining, with the vehicle display server within the one of the at least one remote vehicle, via communication with the host server, information related to the user specific content that the user was viewing in the vehicle prior to exiting the vehicle; and automatically resuming display of the user specific content on the user display system within the one of the at least one remote vehicle into which the user entered.

18. The method of claim 17, further including: coordinating, with the host server, the vehicle display server and the user display system positioned within the vehicle and being viewed by a first user seated within the vehicle with the vehicle display server and user display system positioned within a one of the at least one remote vehicle and being viewed by a second user; and facilitating, with the host server, communication and interaction between the first user and the second user.

19. The method of claim 18, wherein the host server is in communication with a personal device of a user, the method further including: when the user is viewing user specific content on the user display system within the vehicle and the user exits the vehicle: detecting, with the host server and the plurality of sensors positioned within the vehicle via communication with the vehicle display server within the vehicle, when the user leaves the vehicle; automatically pausing, with the host server, the user specific content that is currently being displayed on the user display system within the vehicle; and automatically resuming, with the host server, displaying the user specific content on the personal device of the user; and when the user is viewing user specific content on the personal device and the user enters the vehicle:
  detecting, with the host server and the plurality of sensors positioned within the vehicle via communication with the vehicle display server within the vehicle, when the user enters the vehicle; automatically prompting, with the host server, the user with the option to selectively:
  pause the user specific content that is currently being displayed on the personal device; and
  resume displaying the user specific content on the user display system within the vehicle.

20. A system for enabling vehicle display and interaction, comprising:
  a cloud-based host server in communication, via a wireless communication network, with a vehicle display server positioned within a vehicle and a vehicle display server positioned within a one of at least one remote vehicle,
  wherein each of the vehicle display server positioned within the vehicle and the vehicle display server positioned within the one of at least one remote vehicle are in communication with:
  a plurality of sensors positioned within the vehicle and the one of the at least one remote vehicle, respectively, and adapted to:
    track head and eye position and movement of users seated therein;
    detect seating positions of users and when users change seating positions; and
    detect when a user enters and exits;
  detect and interpret facial and gesture inputs from users;
  capture images of users;
  receive audio inputs from users;
  haptic feedback devices positioned within the vehicle and the one of the at least one remote vehicle, respectively, and adapted to provide haptic feedback to users seated therein; and
  a user display system positioned within the vehicle and a user display system positioned within the one of the at least one remote vehicle for viewing and interaction by users therein;
  further wherein, each of the vehicle display server within the vehicle and the vehicle display server within the one of the at least one remote vehicle is adapted to:
  identify, using the plurality of sensors, computer vision algorithms and stored data, within the cloud-based host server, an identity of a user seated therein;
  select, using the identity of the user, user specific content to be displayed for the user; and
  automatically display the user specific content on the user display system; wherein: when a user seated at a first seating position within the vehicle moves to a second seating position within the vehicle, the vehicle display server positioned within the vehicle is adapted to detect when the user leaves the first seating position, pause user specific content that is currently being displayed on the user display system for the first seating position within the vehicle, detect when the user sits at the second seating position, and resume displaying the user specific content on the user display system for the second seating position; when a user seated within the vehicle exits the vehicle and moves to the one of the at least one remote vehicle, the vehicle display server positioned within the vehicle is adapted to detect when the user leaves the vehicle, and pause user specific content that is currently being displayed on the user display system within the vehicle, and the vehicle display server positioned within the one of the at least one remote vehicle is adapted to detect when the user enters the one of the at least one remote vehicle, and resume displaying the user specific content on the user display system within the one of the at least one remote vehicle; and when a user that is viewing the user display system within the vehicle looks away from the user display system within the vehicle, the vehicle display server within the vehicle is adapted to identify when the user looks away from the user display system within the vehicle, pause user specific content that is being displayed, identify when the user returns to looking at the user display system within the vehicle, and resume displaying the user specific content on the user display system within the vehicle; and further wherein, the host server is adapted to coordinate the vehicle display server and the user display system within the vehicle with the vehicle display server and the user display system within the one of the at least one remote vehicle and to facilitate communication and interaction between the user within the vehicle and a user within the one of the at least one remote vehicle; and further wherein, the host server is in communication with a personal device of a user, wherein: when the user is viewing user specific content on the user display system within the vehicle and the user exits the vehicle, the host server is adapted to: detect, with the plurality of sensors positioned within the vehicle via communication with the vehicle display server within the vehicle, when the user leaves the vehicle; automatically pause the user specific content that is currently being displayed on the user display system within the vehicle; and automatically resume displaying the user specific content on the personal device of the user; and when the user is viewing user specific content on the personal device and the user enters the vehicle, the host server is adapted to: detect, with the plurality of sensors positioned within the vehicle via communication with a vehicle display server within the vehicle, when the user enters the vehicle; automatically prompt the user with the option to selectively: pause the user specific content that is currently being displayed on the personal device; and resume displaying the user specific content on a user display system within the vehicle.

* * * * *